(12) United States Patent
Yamamoto

(10) Patent No.: US 10,279,623 B2
(45) Date of Patent: May 7, 2019

(54) BICYCLE TRANSMISSION

(71) Applicant: Shimano Inc., Sakai, Osaka (JP)

(72) Inventor: Takashi Yamamoto, Osaka (JP)

(73) Assignee: Shimano Inc., Osaka (JP)

(*) Notice: Subject to any disclaimer, the term of this patent is extended or adjusted under 35 U.S.C. 154(b) by 149 days.

(21) Appl. No.: 15/466,524

(22) Filed: Mar. 22, 2017

(65) Prior Publication Data

US 2017/0291449 A1 Oct. 12, 2017

(30) Foreign Application Priority Data

Apr. 7, 2016 (JP) ................................ 2016-077438

(51) Int. Cl.

| | |
|---|---|
| *B60B 27/04* | (2006.01) |
| *B60B 27/02* | (2006.01) |
| *B62M 9/06* | (2006.01) |
| *B62M 25/08* | (2006.01) |
| *F16D 41/12* | (2006.01) |
| *B62M 11/16* | (2006.01) |

(Continued)

(52) U.S. Cl.
CPC .......... *B60B 27/047* (2013.01); *B60B 27/023* (2013.01); *B62M 9/06* (2013.01); *B62M 11/16* (2013.01); *B62M 11/18* (2013.01); *B62M 25/08* (2013.01); *F16D 41/12* (2013.01); *F16D 41/30* (2013.01)

(58) Field of Classification Search
CPC ...... B60B 27/047; B60B 27/023; B62M 9/06; B62M 11/16; B62M 11/18; B62M 25/08; F16D 41/12

USPC .......................................................... 280/238
See application file for complete search history.

(56) References Cited

U.S. PATENT DOCUMENTS

| | | | |
|---|---|---|---|
| 5,967,937 A * | 10/1999 | Matsuo | .................. B62M 25/08 475/297 |
| 6,641,500 B2 | 11/2003 | Shoge | |
| 6,875,150 B2 | 4/2005 | Matsuo et al. | |

(Continued)

FOREIGN PATENT DOCUMENTS

| | | |
|---|---|---|
| EP | 2062810 A1 | 5/2009 |
| JP | 10-96453 A | 4/1998 |

(Continued)

*Primary Examiner* — Tony H Winner
*Assistant Examiner* — Felicia L. Brittman
(74) *Attorney, Agent, or Firm* — Global IP Counselors, LLP

(57) ABSTRACT

A bicycle transmission includes an axle, an input component, a power transmission mechanism, a shift mechanism and an output component. The input component receives manually applied rotational force. The output component is rotatably supported by the axle. The power transmission mechanism transmits the rotational force of the input component to the output component through one of a plurality of power transmission paths. The shift mechanism includes a shift input member, a shift control member, a first saver spring and a second saver spring. The shift input member is settable in a plurality of rotational positions. The shift control member rotates in conjunction with movement of the shift input member to select one of the power transmission paths. In the shift mechanism, as the shift input member rotates in the first direction, the shift control member receives the rotational force applied in a first direction through the first saver spring.

18 Claims, 12 Drawing Sheets

(51) Int. Cl.
*B62M 11/18* (2006.01)
*F16D 41/30* (2006.01)

(56) References Cited

U.S. PATENT DOCUMENTS

| | | | |
|---|---|---|---|
| 2003/0130079 A1 | 7/2003 | Shoge | |
| 2005/0252750 A1* | 11/2005 | Matsueda | B62M 11/16 192/217.4 |
| 2009/0036261 A1 | 2/2009 | Hino | |
| 2009/0131214 A1 | 5/2009 | Okoochi et al. | |
| 2010/0051373 A1* | 3/2010 | Lee | B62M 6/55 180/206.4 |
| 2012/0305325 A1* | 12/2012 | Ito | B62M 6/65 180/206.6 |
| 2013/0145885 A1 | 6/2013 | Kitamura et al. | |
| 2015/0011346 A1* | 1/2015 | MacMartin | B62M 6/55 475/4 |

FOREIGN PATENT DOCUMENTS

| | | |
|---|---|---|
| JP | 2001-287687 A | 10/2001 |
| JP | 2003-237678 A | 8/2003 |
| JP | 3654845 B2 | 6/2005 |

\* cited by examiner

BICYCLE TRANSMISSION

CROSS-REFERENCE TO RELATED APPLICATIONS

This application claims priority to Japanese Patent Application No. 2016-077438, filed on Apr. 7, 2016. The entire disclosure of Japanese Patent Application No. 2016-077438 is hereby incorporated herein by reference.

BACKGROUND

Field of the Invention

The present invention relates to a bicycle transmission, and particularly to an internal transmission that is configured to be mounted to a bicycle.

Background Information

There has been developed a type of internal transmission in which a shift mechanism is configured to be operated with a motor (see e.g., U.S. Patent Application Publication No. 2013/0145885). An example of this type of internal transmission is an internal geared hub SG-505 (produced by SHIMANO INC.) in which a shift assist mechanism is installed to assist a gear-shifting action of the shift mechanism with a manual drive force.

In this type of transmission with the shift assist mechanism, it is desirable to efficiently transmit a manual drive force inputted into the shift assist mechanism to the shift mechanism.

SUMMARY

A bicycle transmission according to the present invention includes an axle, an input component, an output component, a power transmission mechanism, a shift mechanism and a shift assist mechanism. The input component is rotatably supported by the axle. The output component is rotatably supported by the axle to receive a rotational force manually applied thereto. The power transmission mechanism is configured to transmit the rotational force of the input component to the output component through any one of a plurality of power transmission paths. The power transmission mechanism is configured to change a rotational velocity of the output component with respect to a rotational velocity of the input component. The shift mechanism includes a shift input member, a shift control member, a first saver spring and a second saver spring. The shift input member is configured to settable in a plurality of rotational positions about the axle. The shift control member is rotated in conjunction with movement of the shift input member so as to select any one of the plurality of power transmission paths. In the shift mechanism, the shift control member receives the rotational force applied in a first direction about the axle through the first saver spring as the shift input member is rotated in the first direction. In the shift mechanism, the shift control member receives the rotational force applied in a second direction opposite to the first direction through the second saver spring as the shift input member is rotated in the second direction. The shift assist mechanism is configured transmit the rotational force applied in the first direction by the input component to a shifting force transmission path between the second saver spring and the shift control member as the shift input member is rotated in the first direction.

The rotational force from the shift assist mechanism is given to the shift control member without through the first saver spring and the second saver spring. The shift assist mechanism and the shift input member are connected through the second saver spring. Hence, the rotational force from the shift assist mechanism can be inhibited from dispersedly transmitted to the shift input member. Therefore, the manual drive force can be efficiently transmitted to the shift mechanism. Additionally, as the shift input member is rotated in the first direction, the shift control member receives the rotational force through the first saver spring. Contrarily, as the shift input member is rotated in the second direction, the shift control member receives the rotational force through the second saver spring. Hence, even as the shift control member is not rotated due to a large drive torque given to the transmission, it is possible to inhibit occurrence of a situation that an excessive load is applied to a transmission path from the shift input member to the shift control member.

The shift mechanism can include an electric actuator that is configured to rotate the shift input member. According to this construction, a shifting action is electrically controllable. Even as the electric actuator is connected to the shift input member, the rotational force from the shift assist mechanism is inhibited from being given to the shift input member. Hence, it is possible to reduce a load to be given to the electric actuator as the shift assist mechanism operates.

The electric actuator can be a motor. According to this construction, the shift mechanism is enabled to operate with the rotational force of the motor.

The shift mechanism can include an speed reducer decelerating a rotation of the motor and transmit decelerated rotation to the shift input member. According to this construction, the motor can be produced in small size.

The motor can be configured to be detachably attached to the axle. According to this construction, a maintenance work of the motor can be easily done.

The shift mechanism can include a controller controlling the electric actuator so as to set the shift input member in any one of the plurality of rotational positions. According to this construction, positioning of the shift input member can be electrically made.

The shift mechanism can include a housing for accommodating the motor. The controller can be provided to the housing. According to this construction, the motor and the controller can be easily protected from dust, water and so forth.

The shift mechanism can include an intermediate member, a first spring coupling member and a second spring coupling member. The intermediate member is a member to which the shift input member is contactable from an upstream side in the first direction. The intermediate member is disposed between the shift input member and the shift control member. The first spring coupling member is a member to which the intermediate member is contactable from the upstream side in the first direction. The second spring coupling member is contactable to the shift input member from the upstream side in the first direction. The first saver spring is coupled to the first spring coupling member and the shift control member. The first saver spring biases the first spring coupling member in the second direction, and biases the shift control member in the first direction. The second saver spring is coupled to the first spring coupling member and the second spring coupling member. The second saver spring biases the first spring coupling member in the second direction, and biases the second spring coupling member in the first direction.

As the shift input member is rotated in the first direction, the shift input member can be configured to press the intermediate member in the first direction so as to cause the intermediate member to press the first spring coupling member in the first direction. According to this construction, as the shift input member is rotated in the first direction, the shift input member is configured to press and rotate the intermediate member in the first direction. As rotated in the first direction, the intermediate member is configured to press the first spring coupling member. The first spring coupling member is thereby configured to be rotated in the first direction, and the first saver spring is configured to rotate the shift control member in the first direction.

The shift mechanism can include an assistance force input member and a rotary member. The assistance force input member is a member to which the intermediate member is contactable from a downstream side in the first direction and to which the rotational force is configured to be inputted from the shift assist mechanism. The rotary member is a member to which the assistance force input member is contactable from the downstream side in the first direction. The rotary member is contactable to the shift control member from the downstream side in the first direction. The rotary member is rotatably mounted about the axle.

As the shift input member is rotated in the second direction, the shift mechanism can be configured such that: the shift input member presses the second spring coupling member in the second direction; the first spring coupling member presses the intermediate member in the second direction; the intermediate member presses the assistance force input member in the second direction; and the rotary member presses the shift control member in the second direction.

The shift assist mechanism can include a tubular member, at least one pawl member, at least one biasing member and a pawl control member. The tubular member is configured to be movable in conjunction with the input component. The tubular member is provided with ratchet teeth on an inner peripheral surface thereof. The ratchet teeth are aligned at intervals in a circumferential direction. The at least one pawl member is mounted to the assistance force input member so as to be movable to a first position and a second position. The at least one pawl member is engageable with the ratchet teeth in the first position. The at least one pawl member is disengageable from the ratchet teeth in the second position. The at least one biasing member is mounted to the assistance force input member so as to bias the at least one pawl member toward the first position. The pawl control member is configured to be restricted from moving in the first direction by the intermediate member. The pawl control member is configured to be rotated in the first direction in conjunction with movement of the at least one pawl member from the second position to the first position as the intermediate member is rotated in the first direction. The pawl control member is configured to move the at least one pawl member from the first position to the second position as the assistance force input member is rotated in the first direction while the at least one pawl member is disposed in the first position and the intermediate member is not in motion.

According to this configuration, as the shift input member is rotated in the first direction, the intermediate member is also rotated in the first direction and the position of the pawl control member, which is restricted by the intermediate member, is also moved in the first direction. Hence, the at least one pawl biasing member is capable of rotating the pawl control member in the first direction through the at least one pawl member. The at least one pawl member is moved from the second position to the first position. As the at least one pawl member is engaged with the ratchet teeth of the tubular member, the first directional rotation of the input component can be inputted into the assistance force input member. As the shift input member is stopped rotating in the first direction, the intermediate member is stopped rotating in the first direction and the restricted position of the intermediate member is also stopped moving. Under the condition, as the assistance force input member is rotated in the first direction, the at least one pawl member makes contact with the pawl control member and the at least one pawl member is moved from the first position to the second position. The at least one pawl member can be automatically moved from the second position to the first position in gear shifting to rotate the shift control member in the first direction, and otherwise, can be held in the second position.

The pawl control member can be disposed at an interval from the shift input member so as not to make contact with the shift input member from the upstream in the first direction as rotated in the first direction. According to this construction, a situation does not occur that as the assistance force input member is rotated in the first direction by the manual drive force, the manual drive force is directly given to the shift input member through the pawl control member.

The at least one pawl member can be pivotally mounted to the assistance force input member so as to pivot about an axis arranged parallel to the axle. According to this construction, the axis about which the assistance force input member is rotated and the axis about which the at least one pawl member pivots are arranged in parallel to each other. Hence, this enables the at least one pawl member to smoothly pivot.

As the rotational force is inputted to the assistance force input member from the shift assist mechanism, the assistance force input member can be configured to press the rotary member in the first direction and the rotary member can be configured to press the shift control member in the first direction. According to this configuration, the rotational force to be given to the assistance force input member by the manual drive force can be transmitted to the shift control member without being changed.

The shift assist mechanism can include a torque limit mechanism. The torque limit mechanism is mounted between the input component and the tubular member. The torque limit mechanism is configured to limit a torque to be transmitted to the tubular member. According to this construction, the manual drive force to be inputted into the assistance force input member can be limited. Hence, an excessive load can be inhibited from acting on the shift mechanism.

The power transmission mechanism can be configured to change the selected one to another in the plurality of power transmission paths in conjunction with rotation of the shift input member in the first direction such that the rotational velocity of the output component becomes lower than the rotational velocity of the input component. According to this configuration, gear shifting of the shift mechanism can be assisted by the shift assist mechanism in a shifting-down action that gear shifting is often made while the manual drive force is being applied to the input component.

The axle can be a hub axle. The output component can be a hub shell. According to this construction, the manual drive force can be efficiently transmitted to the shift mechanism in an internal gear hub for a bicycle.

Overall, according to the present invention, in a bicycle transmission including a shift assist mechanism, a manual drive force can be efficiently transmitted to the shift mechanism and gear shifting performance can be enhanced.

BRIEF DESCRIPTION OF THE DRAWINGS

Referring now to the attached drawings which form a part of this original disclosure.

DETAILED DESCRIPTION OF EMBODIMENTS

Figure 1:
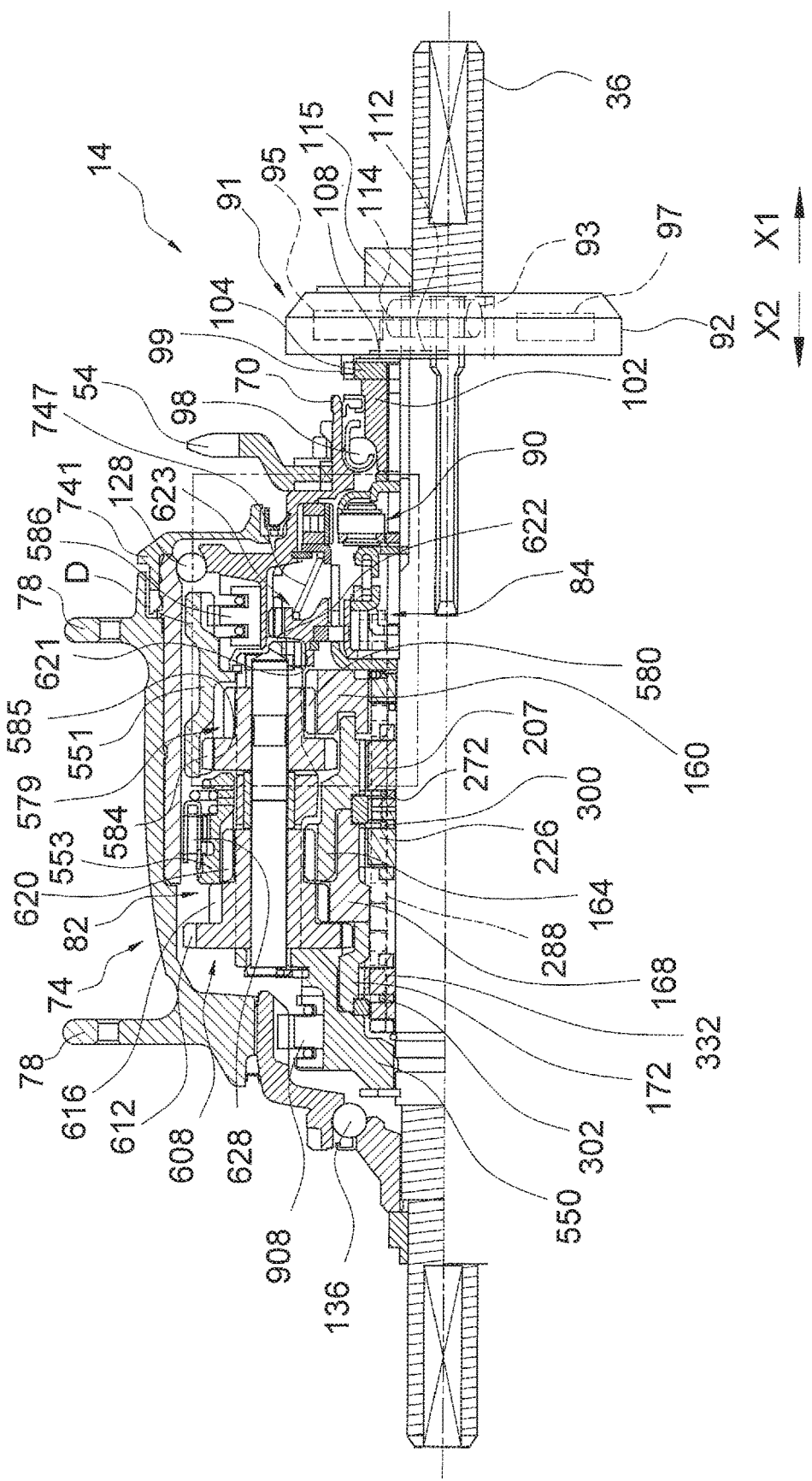
FIG. 1 is a half cutaway cross-sectional view of an internal transmission according to an exemplary embodiment.

In FIG. 1, an internal transmission 14 is a bicycle transmission according to an exemplary embodiment of the present invention, and includes an axle 36, an input component 70, an output component 74, a power transmission mechanism 82, a shift mechanism 84 and a shift assist mechanism 90. In the present exemplary embodiment, the internal transmission 14 encompasses an internal gear hub configured to be mounted to a rear wheel of a bicycle. Therefore, the axle 36, the input component 70 and the output component 74 correspond to a hub axle, a driver and a hub shell, respectively. Gear shifting of the internal transmission 14 is configured to be performed by a motor 93.

It should be noted that in the following explanation, the terms "front", "rear", "left", "right", "up" and "down" and their synonymous terms mean "front", "rear", "left", "right", "up" and "down" seen from a user who is seated on a saddle of a bicycle standing on a flat plane and faces a handlebar (note the bicycle, including the saddle and the handlebar, will not be shown in the drawings).

Axle

Figure 2:
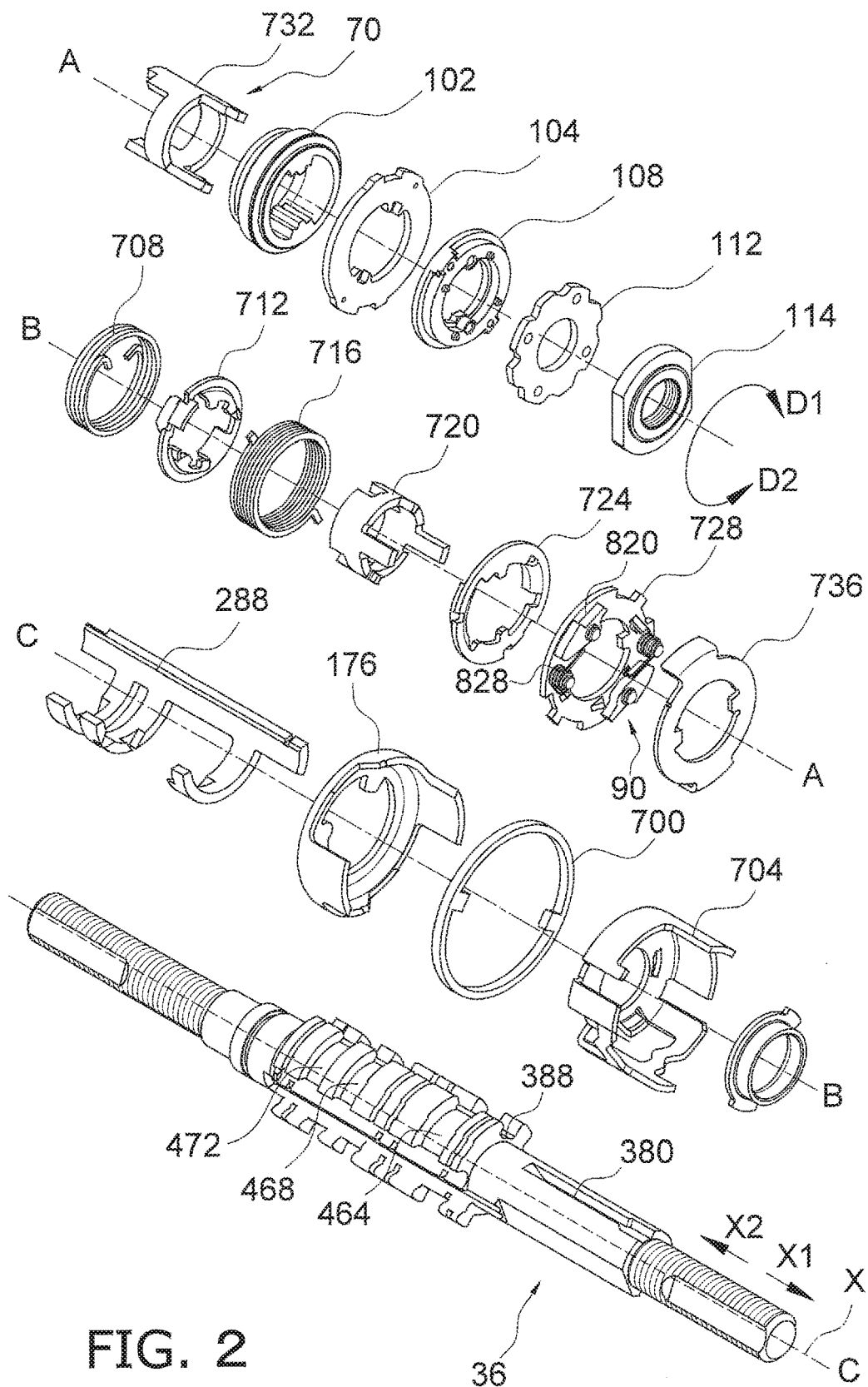
FIG. 2 is an exploded perspective view of a shift mechanism and a shift assist mechanism of the internal transmission illustrated in FIG. 1.

As shown in FIG. 2, the axle 36 has an axis X. The axle 36 is provided with a structure for switching among a plurality of power transmission paths of the power transmission mechanism 82 on its middle part in the extending direction of the axis X. The extending direction of the axis X of the axle 36 will be hereinafter referred to as "axial direction". One of two opposite axial directions will be hereinafter referred to as "first axial direction X1" whereas the other will be hereinafter referred to as "second axial direction X2". Specifically, the axle 36 is provided with a control sleeve groove (not shown in the drawings), a first control arm groove 464, a second control arm groove 468 and a third control sleeve groove 472 on its intermediate part. The control sleeve groove extends in the axial direction of the axle 36, whereas the grooves 464, 468 and 472 extend from the control sleeve groove along the circumferential direction of the axle 36. The first control arm groove 464, the second control arm groove 468 and the third control sleeve groove 472 are disposed at internals in the axial direction. The axle 36 is provided with a first anti-rotational groove 380 and a second anti-rotational groove 388. The first and second anti-rotational grooves 380 and 388 axially extend on the outer peripheral surface of a first end region of its axial middle part. The axle 36 is provided with male threads on the outer peripheral surfaces of its both axial ends.

Input Component

The input component 70 is a tubular member and is rotatably supported by the axle 36. A rotational force manually applied is inputted into the input component 70. The input component 70 is provided with a rear sprocket 54 detachably attached thereto. The rear sprocket 54 is engaged with a spline provided on the outer peripheral part of the input component 70. Thus, the rear sprocket 54 is coupled to the input component 70 while being unitarily rotatable therewith. The rear sprocket 54 is detachably fixed to the input component 70 by, for instance, a snap ring or a locknut. The input component 70 is rotatably supported by the axle 36 through a ball bearing 98. The inner peripheral part of the input component 70 composes a bearing cap of the ball bearing 98. A bearing cone 102 of the ball bearing 98 is held at a constant position by a transmission member 104, a motor mount member 108, a washer 112 and a locknut 114, all of which are included in the shift mechanism 84. The bearing cone 102 is engaged with the first anti-rotational groove 380 of the axle 36. The transmission member 104 is set in any one of a plurality of positions (e.g., 3 to 12 positions; 8 positions in the present exemplary embodiment) by the motor 93. The input component 70 supports a first axial end of the output component 74 through a ball bearing 128 such that the first axial end of the output component 74 is rotatable. The input component 70 is provided with a first one-way clutch 586. The first one-way clutch 586 is located closer to the second axial end of the input component 70 than the ball bearing 128. The first one-way clutch 586 is configured to transmit only moving directional rotation of the input component 70 to the power transmission mechanism 82. For example, the first one-way clutch 586 can be either of a pawl type or of a roller type.

Output Component

The output component 74 is made in the form of a tubular member. The output component 74 is rotatably supported at its second axial end by the axle 36. The output component 74 is supported by the axle 36 through a ball bearing 136. As described above, the first axial end of the output component 74 is rotatably supported by the input component 70 through the ball bearing 128. The output component 74 is provided with a pair of spoke flanges 78 on the both axial ends of its outer peripheral part. A cover member 741 is attached to the output component 74 in order to cover the ball bearing 128. A seal member is mounted between the cover member 741 and the input component 70.

Power Transmission Mechanism

As shown in FIG. 1, the power transmission mechanism 82 is disposed between the input component 70 and the output component 74. The power transmission mechanism 82 is configured to transmit the rotational force of the input component 70 to the output component 74 through any one of the plurality of power transmission paths, and is capable of changing the rotational velocity of the output component 74 with respect to that of the input component 70. In the present exemplary embodiment, the power transmission mechanism 82 is configured to switch among the power transmission paths in conjunction with a shift input member 732 (to be described) rotated in a first direction D1 such that a gear ratio reduces in a stepwise manner. Switching among the power transmission paths will be referred to as "shifting-down" as it is thereby aimed to reduce the gear ratio in a stepwise manner. By contrast, switching among the power transmission paths will be referred to as "shifting-up" as it is thereby aimed to increase the gear ratio in a stepwise manner. The first direction D1 refers to a direction in which the input component 70 is rotated forward. The power transmission mechanism 82 is configured to switch among the power transmission paths in conjunction with the shift input member 732 rotated in a second direction D2, which is opposite to the first direction D1, such that the rotational velocity of the output component 74 increases with respect to that of the input component 70. Switching among the power transmission paths will be also referred to as "shifting up" as it is thereby aimed to increase the rotational velocity of the output component 74 with respect to that of the input component 70.

In the present exemplary embodiment, the power transmission mechanism 82 is configured to select any one of eight power transmission paths. The power transmission mechanism 82 includes a plurality of planetary gear mechanisms. The power transmission mechanism 82 includes a first sun gear 160, a second sun gear 164, a third sun gear 168, a fourth sun gear 172, a second one-way clutch 207, a third one-way clutch 226, a fourth one-way clutch 332 and a clutch ring 623. The second one-way clutch 207, the third one-way clutch 226 and the fourth one-way clutch 332 are pawl clutches, respectively.

The first sun gear 160 is non-rotatably engaged with the second anti-rotational groove 388 of the axle 36. The second sun gear 164 is disposed adjacent to the first sun gear 160, and is rotatably supported by the axle 36. The second one-way clutch 207 is mounted between the second sun gear 164 and the axle 36. The second one-way clutch 207 is biased to be in an on state by a second spring 272. An on/off state of the second one-way clutch 207 is configured to be controlled by the shift mechanism 84. While the second one-way clutch 207 is in the on state, the second sun gear 164 is configured to be non-rotatable in the second direction with respect to the axle 36. Contrarily, while the second one-way clutch 207 is in an off state, the second sun gear 164 is configured to be rotatable in the second direction with respect to the axle 36. The second sun gear 164 is provided with an engaging part on its inner peripheral surface. The engaging part is a part with which a pawl of the second one-way clutch 207 is engageable. While the second one-way clutch 207 is in the on state, the pawl of the second one-way clutch 207 is configured to make contact with the engaging part of the second sun gear 164. Contrarily, while the second one-way clutch 207 is in the off state, the pawl of the second one-way clutch 207 is configured to separate from the engaging part of the second sun gear 164. The third sun gear 168 is disposed adjacent to the second sun gear 164, and is rotatably supported by the axle 36. The third one-way clutch 226 is mounted between the third sun gear 168 and the axle 36. The third one-way clutch 226 is biased to be in an on state by a third spring 300. An on/off state of the third one-way clutch 226 is configured to be controlled by the shift mechanism 84. While the third one-way clutch 226 is in the on state, the third sun gear 168 is configured to be non-rotatable in the second direction with respect to the axle 36. Contrarily, while the third one-way clutch 226 is in an off state, the third sun gear 168 is configured to be rotatable in the second direction with respect to the axle 36. The third sun gear 168 is provided with an engaging part on its inner peripheral surface. The engaging part is a part with which a pawl of the third one-way clutch 226 is engageable as the third one-way clutch 226 is in the on state. While the third one-way clutch 226 is in the on state, the pawl of the third one-way clutch 226 is configured to make contact with the engaging part of the third sun gear 168. Contrarily, while the third one-way clutch 226 is in the off state, the pawl of the third one-way clutch 226 is configured to separate from the engaging part of the third sun gear 168.

The fourth sun gear 172 is disposed adjacent to the third sun gear 168, and is rotatably supported by the axle 36. The fourth one-way clutch 332 is mounted between the fourth sun gear 172 and the axle 36. The fourth one-way clutch 332 is biased to be in an on state by a fourth spring 302. An on/off state of the fourth one-way clutch 332 is configured to be controlled by the shift mechanism 84. While the fourth one-way clutch 332 is in the on state, the fourth sun gear 172 is configured to be non-rotatable in the second direction with respect to the axle 36. Contrarily, while the fourth one-way clutch 332 is in an off state, the fourth sun gear 172 is configured to be rotatable in the second direction with respect to the axle 36. The fourth sun gear 172 is provided with an engaging part on its inner peripheral surface. The engaging part is a part with which a pawl of the fourth one-way clutch 332 is engageable while the fourth one-way clutch 332 is in the on state. While the fourth one-way clutch 332 is in the on state, the pawl of the fourth one-way clutch 332 is configured to make contact with the engaging part of the fourth sun gear 172. Contrarily, while the fourth one-way clutch 332 is in the off state, the pawl of the fourth one-way clutch 332 is configured to separate from the engaging part of the fourth sun gear 172.

As shown in FIG. 1, the power transmission mechanism 82 further includes a planet gear carrier 550, a first ring gear 551 and a second ring gear 553. Each of the planet gear carrier 550, the first ring gear 551 and the second ring gear 553 is mounted to the axle 36 while being rotatable about the axis X of the axle 36.

The planet gear carrier 550 is rotatably mounted to the axle 36. The planet gear carrier 550 supports a single or plurality of first planet gears 579 and a single or plurality of second planet gears 608 such that the first and second planet gears 579 and 608 are rotatable. The number of the first planet gears 579 is at least one, and the number of the second planet gears 608 is also at least one. When there is a plurality of the first planet gears 579, the first planet gears 579 are disposed at equal intervals in the circumferential direction about the axis X. Likewise, when there is a plurality of the second planet gears 608, the second planet gears 608 are disposed at equal intervals in the circumferential direction about the axis X. The planet gear carrier 550 can be directly supported by the axle 36. Alternatively, the planet gear carrier 550 can be supported by the axle 36 through the at least one first planet gear 579 and the at least one second planet gear 608. A fifth one-way clutch 908 is mounted between the planet gear carrier 550 and the output component 74. The fifth one-way clutch 908 is configured to transmit rotation in a bicycle moving direction from the planet gear carrier 550 to the output component 74.

The planet gear carrier 550 is provided with at least one first spline 621 on the inner peripheral part of its first axial end. The at least one first spline 621 is configured to be engageable with at least one second spline 622 provided on the clutch ring 623.

The clutch ring 623 is made in the form of an annular member. The clutch ring 623 is supported by a shift key member 700 (to be described) while being rotatable with respect thereto and being axially movable therewith. The inner peripheral part of the clutch ring 623 makes contact with the outer peripheral surface and the first axial lateral surface of the shift key member 700. The clutch ring 623 is configured to allow and block transmission of rotation between the input component 70 and the planet gear carrier 550. The clutch ring 623 is configured to be movable to a clutch-on position shown in FIG. 6 and a clutch-off position shown in FIG. 7. As set in the clutch-on position, the clutch ring 623 is configured to be engaged with the planet gear carrier 550. By contrast, while set in the clutch-off position, the clutch ring 623 is configured to be disengaged away from the planet gear carrier 550. The clutch ring 623 is biased toward the clutch-on position by a clutch spring 747. The clutch ring 623 is pressed by the shift key member 700 of the shift mechanism 84 against the biasing force of the clutch spring 747, and is movable toward the clutch-off position.

Each of the at least one first planet gear 579 includes a small diameter gear part 580 and a large diameter gear part 584. The small diameter gear part 580 is engaged with the first sun gear 160. The large diameter gear part 584 is engaged with the first ring gear 551. Likewise, each of the at least one second planet gear 608 includes a large diameter gear part 612, a medium diameter gear part 616 and a small diameter gear part 620. The large diameter gear part 612 is meshed with the fourth sun gear 172. The medium diameter gear part 616 is meshed with the third sun gear 168. The small diameter gear part 620 is meshed with the second sun gear 164 and the second ring gear 553.

The first ring gear 551 includes an inner peripheral gear part 585. The rotation of the input component 70, applied in the first direction D1, is configured to be transmitted to the first ring gear 551 through the first one-way clutch 586. The moving directional rotation of the second ring gear 553 is transmittable to the output component 74 through a sixth one-way clutch 628. As the planet gear carrier 550 is rotated in the first direction D1 at a lower velocity than the second ring gear 553, the rotation of the second ring gear 553 is configured to be transmitted to the output component 74. The sixth one-way clutch 628 can encompass a roller clutch and/or a pawl clutch.

Shift Mechanism and Shift Assist Mechanism

As shown in FIGS. 1 and 2, the shift mechanism 84 is mounted to the outer peripheral part of the axle 36. The shift mechanism 84 includes a drive unit 91 (see FIG. 1) including the motor 93, the shift input member 732, an assistance force input member 728, a first saver spring 708, a first spring coupling member 712 and an intermediate member 720. Additionally, the shift mechanism 84 includes a second saver spring 716, a second spring coupling member 724, a rotary member 794, the shift key member 700, the clutch cam 176 and a shift control member 288. Moreover, the shift mechanism 84 includes the motor mount member 108 and the transmission member 104. As the shift input member 732 is rotated in the first direction D1 about the axle 36, the shift mechanism 84 is configured to give a rotational force applied in the first direction D1 to the shift control member 288 through the first saver spring 708. Contrarily, as the shift input member 732 is rotated in the second direction D2 opposite to the first direction D1, the shift mechanism 84 is configured to give a rotational force applied in the second direction D2 to the shift control member 288 through the second saver spring 716.

Figure 6:
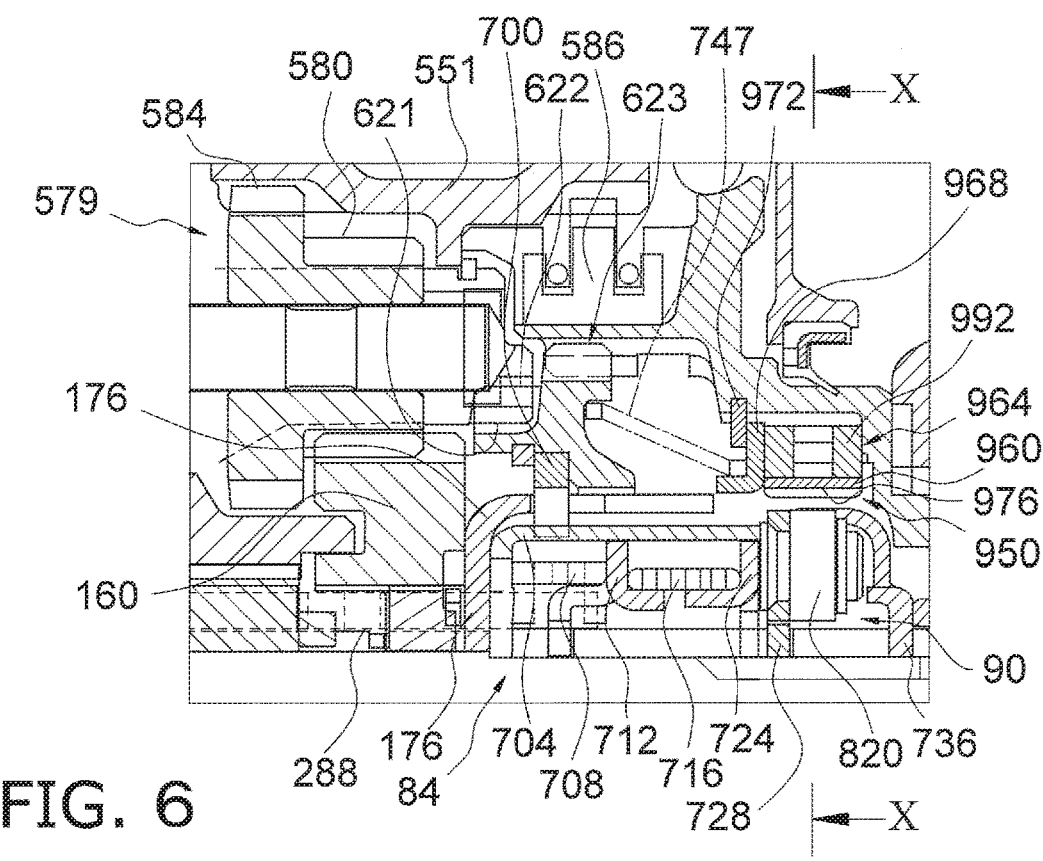
FIG. 6 is enlarged cross-sectional view of a region D enclosed by a dashed line in FIG. 1 and shows a situation that a clutch ring is in a clutch-on state.
Figure 7:
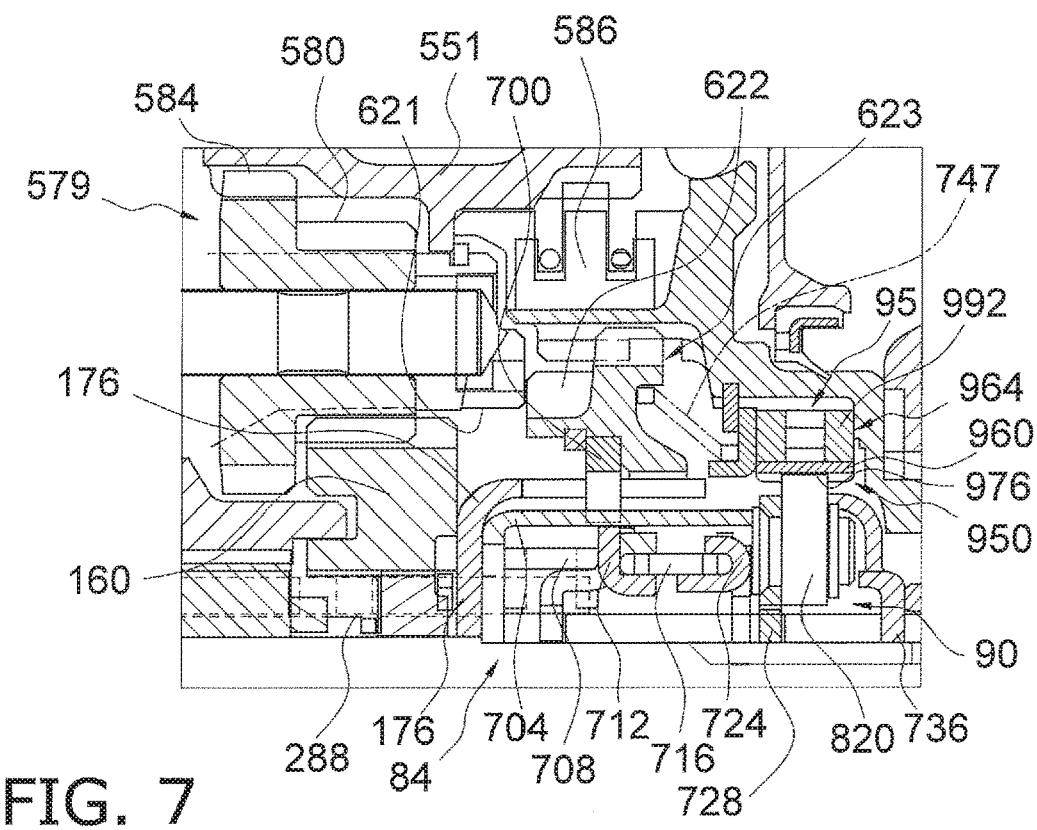
FIG. 7 is a diagram corresponding to FIG. 6 and shows a situation that the clutch ring is in a clutch-off state.

As the shift input member 732 is rotated in the first direction D1, the shift assist mechanism 90 is configured to be capable of transmitting the rotational force of the input component 70, applied in the first direction D1, to a shifting force transmission path between the second saver spring 716 and the shift control member 288. As shown in FIG. 2, the shift assist mechanism 90 includes at least one pawl member 820, at least one pawl biasing member 828 and a pawl control member 736. As shown in FIGS. 6 and 7, the shift assist mechanism 90 further includes a torque limit mechanism 950 and a tubular member 960.

Shift Mechanism

As shown in FIG. 1, in the shift mechanism 84, the drive unit 91 is detachably attached to the motor mount member 108. As shown in FIG. 1, the drive unit 91 is set in an axial position by the motor mount member 108, and is non-rotatably attached to the axle 36 while being interposed between the motor mount member 108 and a nut 115. The motor mount member 108 is engaged with the first anti-rotational groove 380 of the axle 36. The drive unit 91 includes a housing 92 and the motor 93. The drive unit 91 preferably further includes a speed reducer 95. Also, the drive unit 91 preferably further includes a controller 97. Here, the controller 97 is an electronic control unit includes an arithmetic processing unit that executes predetermined control programs, and memory that stores information used by various kinds of control programs and various kinds of control processes. The arithmetic processing unit includes, for example, a central processing unit (CPU) or a micro processing unit (MPU) having a processor that executes the control programs. The motor 93 is an exemplary electric actuator. The housing 92 accommodates the motor 93, the speed reducer 95 and the controller 97. The speed reducer 95 is configured to decelerate the rotation of the motor 93 and transmit the decelerated rotation to the shift input member 732. The controller 97 is configured to control the motor 93 whereby the shift input member 732 is set in any one of a plurality of rotational positions. The controller 97 is electrically connected to a gear shifter mounted to a bicycle through an electric cable (not shown in the drawings). The drive unit 91 is configured to be capable of rotating the shift input member 732 in the first direction D1 and the second direction D2 opposite to the first direction D1. The first direction D1 refers to a direction in which a bicycle wheel is rotated forward.

Figure 3:
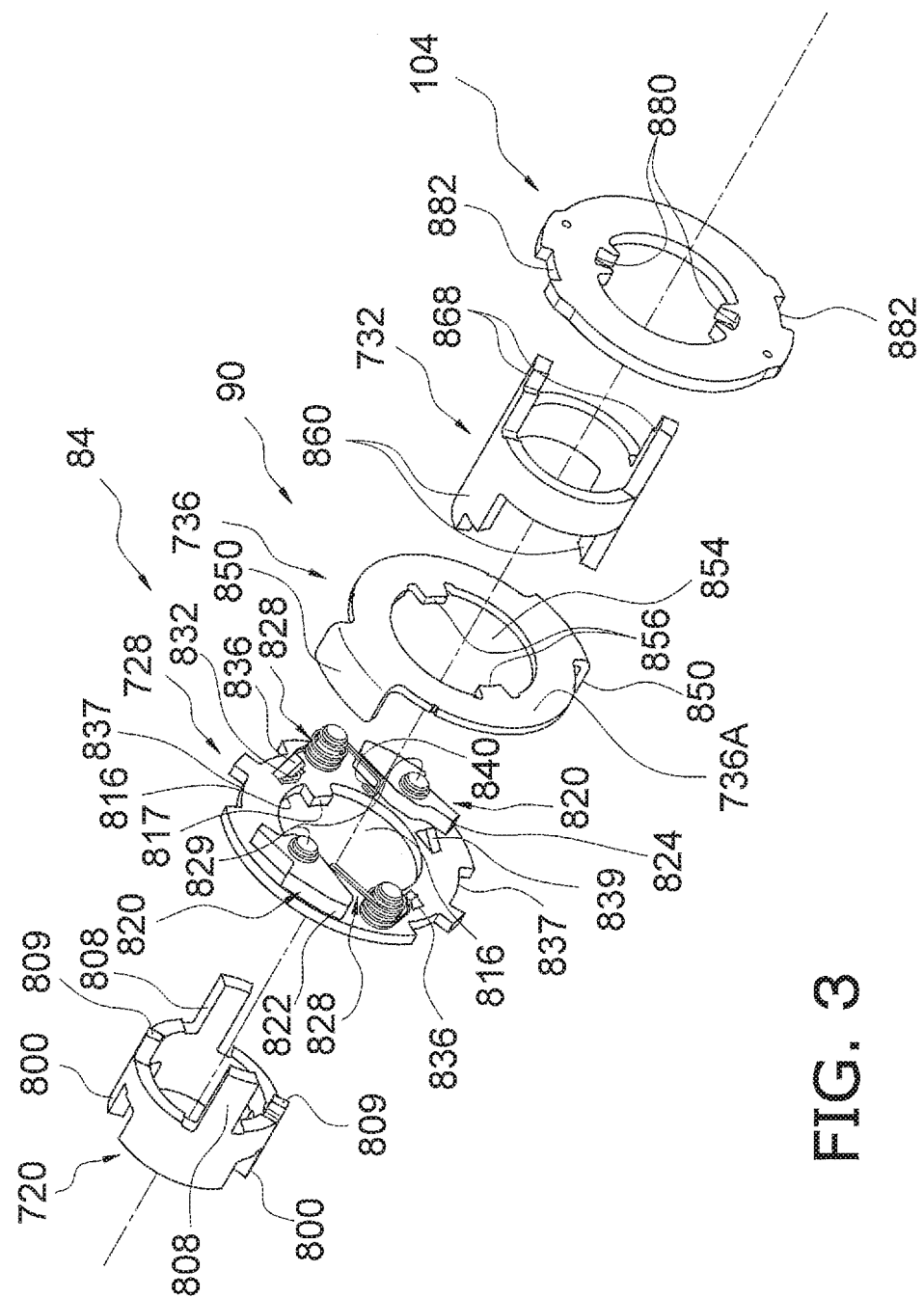
FIG. 3 is an enlarged exploded perspective view of selected parts of the shift mechanism and the shift assist mechanism illustrated in FIG. 2.

The shift mechanism 84 further includes the transmission member 104. The transmission member 104 is configured to be rotated about the axis X unitarily with the shift input member 732. The transmission member 104 is engaged with an output shaft 99 of the speed reducer 95, and is configured to be rotatable together with the output shaft 99 with respect to the axle 36. As shown in FIG. 3, the transmission member 104 is an annular member that includes a coupling part 880 on its inner peripheral part. The coupling part 880 is non-rotatably connected to the shift input member 732. The coupling part 880 includes, for instance, a plurality of recesses. For example, the recesses of the coupling part 880 are herein two recesses disposed at equal intervals in the circumferential direction of the transmission member 104. Additionally, the transmission member 104 includes a second coupling part 882 on its outer peripheral part. The second coupling part 882 is non-rotationally connected to the output shaft 99 of the speed reducer 95. The second coupling part 882 includes, for instance, a plurality of recesses. For example, the recesses of the second coupling part 882 are herein two recesses disposed at equal intervals in the circumferential direction of the transmission member 104. The second coupling part 882 is preferably disposed radially outside the coupling part 880.

Figure 5:
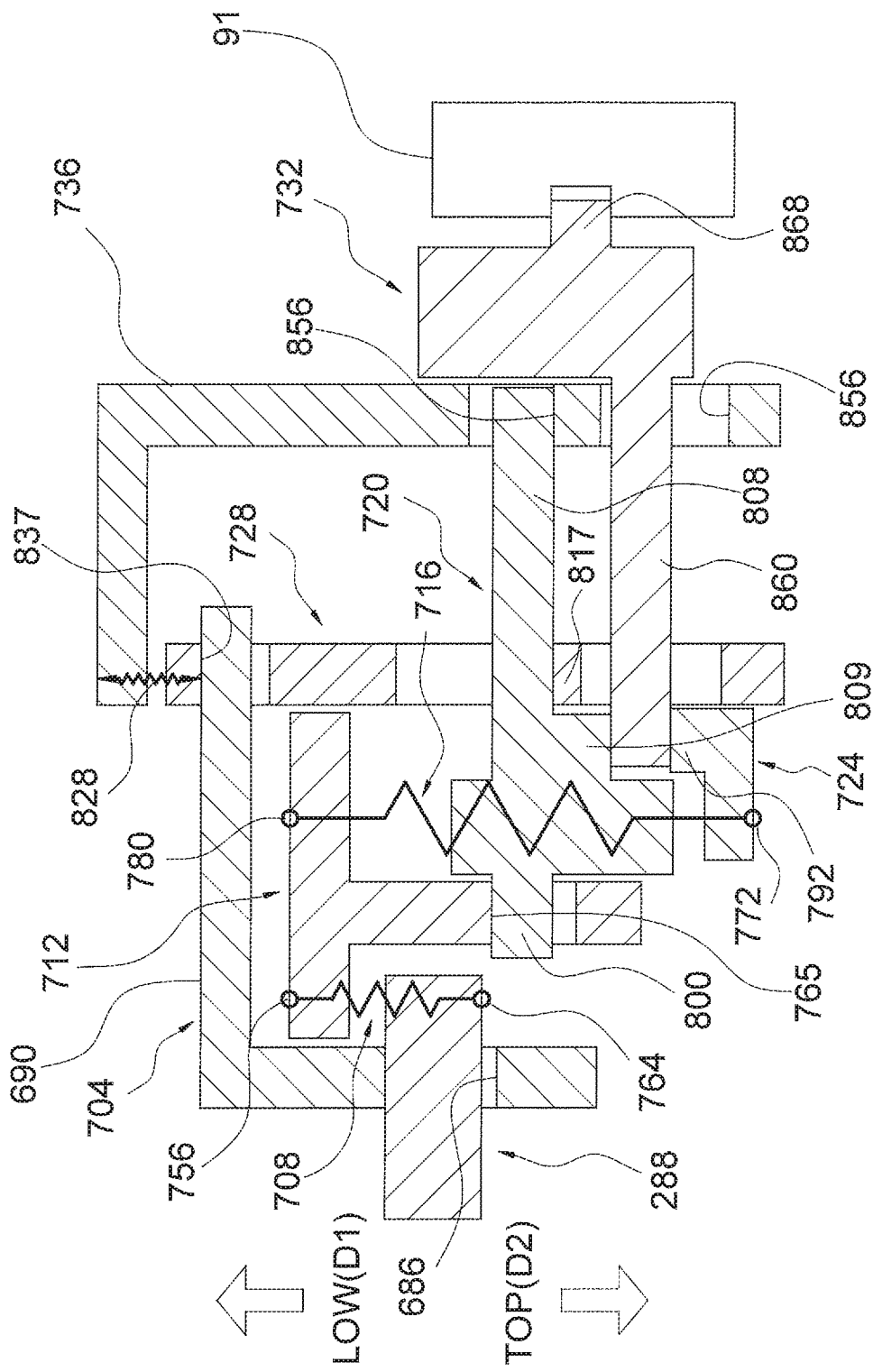
FIG. 5 is a schematic diagram for explaining actions of the shift mechanism and the shift assist mechanism illustrated in FIG. 2.

The shift input member 732 is made in the form of a tubular member. The shift input member 732 is disposed coaxially to the axle 36, and is rotatably supported by the outer peripheral surface of the axle 36. The shift input member 732 is settable in a plurality of rotational positions about the axle 36. The shift input member 732 includes a first coupling part 868 and a second coupling part 860. The first coupling part 868 extends toward the transmission member 104 along the axial direction, whereas the second coupling part 860 extends toward the intermediate member 720 along the axial direction. The first coupling part 868 includes at least one protrusion. For example, the first coupling part 868 includes two protrusions disposed about the axis X at equal intervals. The second coupling part 860 includes a single protrusion or a plurality of protrusions. For example, the second coupling part 860 includes two protrusions disposed about the axis X at equal intervals. The first coupling part 868 is engaged with the coupling part 880 of the transmission member 104 while passing through the inner periphery of the bearing cone 102. With this construction, the shift input member 732 is configured to be rotated in the first direction D1 and the second direction D2 in conjunction with the output shaft 99. The rotational range of the shift input member 732 is restricted by the bearing cone 102. As shown in FIG. 5, the second coupling part 860 of the shift input member 732 is contactable to the intermediate member 720 and the second spring coupling member 724 while passing through the inner periphery of the pawl control member 736 and that of the assistance force input member 728. When rotated in the first direction D1, the shift input member 732 is configured to press the intermediate member 720 in the first direction D1, and in turn, the intermediate member 720 is configured to press the first spring coupling member 712 in the first direction D1.

The assistance force input member 728 is made in the form of an annular member. The assistance force input member 728 is a member to which the intermediate member 720 is contactable from the downstream side in the first direction D1 and to which a rotational force is capable of being inputted from the shift assist mechanism 90. The assistance force input member 728 is rotatably supported by the shift input member 732. The assistance force input member 728 is provided with an opening 816 having an approximately circular shape. The shift input member 732 is inserted through the opening 816 of the assistance force input member 728. The assistance force input member 728 includes a first engaging part 817 provided on the same side as the opening 816. The first engaging part 817 includes, for instance, at least one protrusion protruding toward the opening 816. The first engaging part 817 includes, for instance, two protrusions disposed at equal intervals about the axis X. The first engaging part 817 is a part to which a first coupling part 808 (to be described) of the intermediate member 720 is contactable. The first coupling part 808 is contactable to the assistance force input member 728 from the upstream side in the second direction D2. The first coupling part 808 makes contact with the pawl control member 736 from the upstream side in the second direction D2. The first coupling part 808 restricts the position of the pawl control member 736 by making contact with the pawl control member 736 from the upstream side in the second direction D2. The assistance force input member 728 includes a coupling part 837 that can be coupled to the rotary member 704. The coupling part 837 is provided on the outer peripheral part of the assistance force input member 728. The coupling part 837 includes at least one recess. The coupling part 837 includes, for instance, recesses disposed at equal intervals about the axis X. The coupling part 837 is contactable to the rotary member 704 from both the upstream side and the downstream side in the second direction D2. The width of each recess of the coupling part 837 in the circumferential direction about the axis X is slightly larger than that of a coupling part 690 (to be described) of the rotary member 704 in the circumferential direction about the axis X.

At least one pawl member 820 and at least one pawl biasing member 828 for biasing the at least one pawl member 820, both of which compose part of the shift assist mechanism 90, are mounted to the assistance force input member 728. In the present exemplary embodiment, a plurality of (e.g., two) pawl members 820 and a plurality of (e.g., two) pawl biasing members 828 are mounted to the assistance force input member 728. The pawl members 820 are disposed at intervals in the circumferential direction about the axis X. The two pawl members 820 are disposed at, for instance, equal intervals about the axis X. Each of the pawl members 820 is supported by a pawl support pin 829 that is mounted to the assistance force input member 728 while being pivotally arranged about an axis parallel to the axle 36. Each of the pawl members 820 is configured to be movable to a first position shown in FIG. 11 and a second position shown in FIG. 10. In the first position, each of the pawl members 820 is configured to be engageable at its tip end 822 with ratchet teeth 976. The ratchet teeth 976 are provided on the tubular member 960, while being disposed at intervals in the circumferential direction. In the second position, each of the pawl members 820 is configured to be disengaged at its tip end 822 away from the ratchet teeth 976. Each of the pawl biasing members 828 biases one of the pawl members 820 toward the first position. When disposed in the first position, each of the pawl members 820 makes contact at its base end 824 with a positioning protrusion 839 provided on the assistance force input member 728. Accordingly, movement of each of the pawl member 820 by each pawl biasing member 828 is stopped. Each pawl members 820 is controlled to be moved back and forth between the first position and the second position by the pawl control member 736.

Each of the pawl biasing members 828 is, for instance, a torsion coil spring. One end 832 of each of the pawl biasing members 828 is hooked on a spring coupling part 836 provided on the assistance force input member 728. The other end 840 of each of the pawl biasing members 828 presses the tip end 822 of each of the pawl members 820 from the radial inside to the radial outside of the assist force input member 728.

The intermediate member 720 is made in the form of a tubular member. The intermediate member 720 is disposed between the shift input member 732 and the shift control member 288. The intermediate member 720 is a member to which the shift input member 732 is contactable from the upstream side in the first direction D1. The intermediate member 720 is rotatably supported by the axle 36. The intermediate member 720 includes the first coupling part 808, a second coupling part 809 and a third coupling part 800. Each of the first coupling part 808, the second coupling part 809 and the third coupling part 800 includes at least one protrusion. Each of the first coupling part 808, the second coupling part 809 and the third coupling part 800 includes, for instance, two protrusions disposed at equal intervals about the axis X. The first coupling part 808 is inserted through the opening 816 of the assistance force input member 728 and extends toward the pawl control member 736 along the axial direction. The first coupling part 808 is contactable to the assistance force input member 728 and the pawl control member 736 from the upstream side in the second direction D2. The second coupling part 809 is a part to which the shift input member 732 is contactable from the upstream side in the first direction D1. As rotated in the first direction D1, the shift input member 732 makes contact with the intermediate member 720, and in turn, the intermediate member 720 is rotated in the first direction D1 in conjunction with the shift input member 732.

Figure 4:
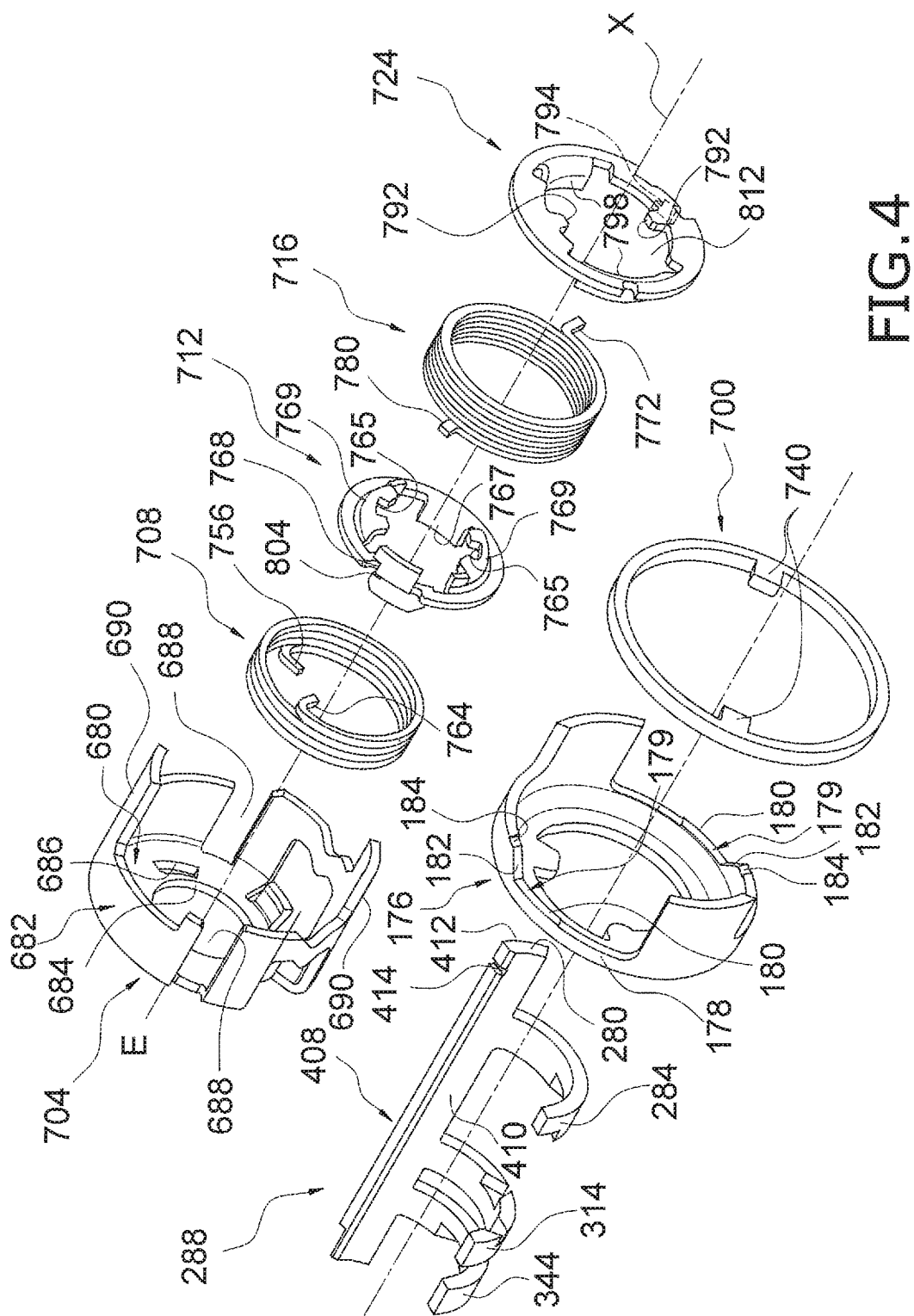
FIG. 4 is an enlarged exploded perspective view of selected parts of the shift mechanism illustrated in FIG. 2.

As shown in FIGS. 6 and 7, the second spring coupling member 724 is disposed between the rotary member 704 and the axle 36. The second spring coupling member 724 is made in the form of an annular member. The axle 36 is inserted through the second spring coupling member 724. The second spring coupling member 724 is configured to be rotatable in the first direction D1 and the second direction D2. As shown in FIG. 4, the second spring coupling member 724 includes a second spring coupling part 794 and a second guide part 798. The second spring coupling part 794 is coupled to a first end 772 of the second saver spring 716. The second spring coupling part 794 is formed by bending the outer peripheral part of the second spring coupling member 724 toward the second saver spring 716.

The second spring coupling member 724 is provided with a second opening 812 through which the second coupling part 860 of the shift input member 732, the first coupling part 808 of the intermediate member 720, and the axle 36 are capable of penetrating. The second spring coupling member 724 further includes a second engaging part 792. The second engaging part 792 includes at least one protrusion. The second engaging part 792 protrudes from the second spring coupling member 724 to the second opening 812. The second engaging part 792 includes, for instance, two protrusions provided at equal intervals about the axis X. The second spring coupling member 724 includes the second guide part 798 for guiding the second saver spring 716. The second guide part 798 includes at least one protrusion protruding from the second spring coupling member 724 in the second axial direction X2. The second guide part 798 includes, for instance, two protrusions disposed at equal intervals about the axis X. The second guide part 798 is mounted on the outer peripheral side of the second saver spring 716 with reference to the axis X. As shown in FIG. 5, as a gear shifting operation is not being performed, the second coupling part 860 of the shift input member 732 makes contact with the second engaging part 792 of the second spring coupling member 724 and the second coupling part 809 of the intermediate member 720 while being interposed therebetween in the circumferential direction about the axis X.

The second saver spring 716 includes the first end 772 and a second end 780 disposed on the opposite side of the first end 772. The second saver spring 716 encompasses, for instance, a torsion coil spring. The second saver spring 716 is disposed adjacent to the second spring coupling member 724 in the second axial direction X2. The first end 772 and the second end 780 bend radially outward with reference to the axis X. The first end 772 is coupled to the second spring coupling part 794. The second end 780 is coupled to the first spring coupling member 712. The second saver spring 716 is coupled to the first spring coupling member 712 and the second spring coupling part 794 while being further extended than its free length condition. As shown in FIG. 5, the second saver spring 716 biases the second spring coupling member 724 in the first direction D1 and biases the first spring coupling member 712 in the second direction D2. As the shift input member 732 is rotated in the second direction D2, the shift input member 732 is configured to make contact with the second spring coupling member 724 and press the second spring coupling member 724 in the second direction D2. As the second spring coupling member 724 is rotated in the second direction D2, the second spring coupling member 724 is configured to pull the first spring coupling member 712 in the second direction D2 through the second saver spring 716. The first spring coupling member 712 is thus configured to be pressed and rotated in the second direction D2.

As shown in FIGS. 6 and 7, the first spring coupling member 712 is disposed between the rotary member 704 and the axle 36. The first spring coupling member 712 is made in the form of an annular member. The axle 36 is inserted through the first spring coupling member 712. The first spring coupling member 712 is configured to be rotatable in the first direction D1 and the second direction D2. As shown in FIG. 4, the first spring coupling member 712 includes a coupling part 765, a first spring coupling part 804, a third spring coupling part 768, a first guide part 767 and a third guide part 769.

The first spring coupling part 804 is coupled to a first end 764 of the first saver spring 708. The first spring coupling part 804 is disposed adjacent to the second saver spring 716 in the second axial direction X2. The first spring coupling part 804 is formed by bending the inner peripheral part of the first spring coupling member 712 toward the first saver spring 708. The third spring coupling part 768 is coupled to the second end 780 of the second saver spring 716. The third spring coupling part 768 is formed by bending the outer peripheral part of the first spring coupling member 712 toward the second saver spring 716. The first spring coupling part 804 and the third spring coupling part 768 are provided in adjacent positions about the axis X. The third guide part 769 guides the inner peripheral part of the second saver spring 716. The third guide part 769 includes at least one protrusion protruding from the first spring coupling member 712 in the first axial direction X1. The third guide part 769 is formed by bending the inner peripheral part of the first spring coupling member 712 toward the second saver spring 716. The coupling part 765 includes, for instance, two recesses disposed at equal intervals about the axis X. The coupling part 765 is provided on the inner peripheral region of the third guide part 769. The coupling part 765 is a part to which the third coupling part 800 of the intermediate member 720 (see FIG. 3) is capable of being coupled. Each recess of the coupling part 765 is provided in each protrusion of the third guide part 769. The width of each recess of the coupling part 765 in the circumferential direction about the axis X is slightly larger than that of the third coupling part 800 of the intermediate member 720 in the circumferential direction about the axis X. As shown in FIG. 5, the first spring coupling member 712 is biased in the second direction D2 by the first saver spring 708 and the second saver spring 716. As a saver function is not being enabled by the first saver spring 708 and the second saver spring 716, the coupling part 765 makes contact with the third coupling part 800 from the upstream side in the second direction D2. The first guide part 767 guides the inner peripheral part of the first saver spring 708.

The first saver spring 708 biases the first spring coupling member 712 in the second direction D2 while being coupled to the first spring coupling member 712. The first saver spring 708 also biases the shift control member 288 in the first direction D1, while being coupled to the shift control member 288. The first saver spring 708 includes the first end 764 and the second end 756 provided on the opposite side of the first end 764. The first saver spring 708 encompasses, for instance, a torsion coil spring. The first end 764 and the second end 756 bend radially inward with reference to the axis X. The first end 764 is coupled to the first spring coupling member 712. The second end 756 is coupled to the shift control member 288. The first saver spring 708 is mounted to the first spring coupling member 712 and the shift control member 288 while being further extended than its free length condition. As shown in FIG. 5, the first saver spring 708 biases the first spring coupling member 712 in the second direction D2 and biases the shift control member 288 in the first direction D1.

The rotary member 704 is configured to rotate the shift key member 700 about the axis X in conjunction with rotation of the shift input member 732. The rotary member 704 is configured to rotate the shift control member 288 in conjunction with rotation of the shift input member 732. The rotary member 704 is configured to transmit a rotational force inputted thereto from the shift assist mechanism 90 to the shift control member 288. The rotary member 704 is mounted to be rotatable about the axis X. As shown in FIG. 4, the rotary member 704 includes a sidewall part 680 and an outer peripheral part 682. The sidewall part 680 has an annular shape. The outer peripheral part 682 has an approximately tubular shape and extends from the outer peripheral region of the sidewall part 680 in the first axial direction X1. The sidewall part 680 is provided with a through hole 684 through which the axle 36 is inserted, and is rotatably supported by the axle 36. The sidewall part 680 is further provided with a coupling hole 686. The coupling hole 686 is located radially outside the through hole 684. The shift control member 288 is inserted into the coupling hole 686, whereby the shift control member 288 and the rotary member 704 can be coupled to each other. The coupling hole 686 extends about the axis X in a circular-arc shape. The outer peripheral part 682 includes at least one guide groove 688 and the coupling part 690. The guide groove 688 guides the shift key member 700 in the directions of the axis X of the axle 36. The coupling part 690 is configured to be capable of being coupled to the coupling part 837 of the assistance force input member 728. The coupling part 690 includes at least one protrusion extending in the first axial direction X1. For example, the coupling part 690 includes two protrusions disposed at equal intervals. In a shifting-down action that a rotational force is not being given to the assistance force input member 728 from the shift assist mechanism 90, the shift control member 288 receives a rotational force of the shift input member 732 applied in the first direction D1 through the intermediate member 720, the first spring coupling member 712 and the first saver spring 708, and thereby the shift control member 288 is configured to be rotatable in the first direction D1. At this time, the rotary member 704 is configured to be pressed and rotated in the first direction D1 by the shift control member 288, and is configured to press and rotate the assistance force input member 728 in the first direction D1. By contrast, in a shifting-up action, the shift input member 732 is configured to be rotated in the second direction D2 and press the second spring coupling member 724 in the second direction D2. Accordingly, the first spring coupling member 712 is configured to press the intermediate member 720 in the second direction D2. In turn, the intermediate member 720 is configured to press the assistance force input member 728 in the second direction D2. Then, the assistance force input member 728 is configured to press the rotary member 704 in the second direction D2. Finally, the rotary member 704 is configured to press, and rotate the shift control member 288 in the second direction D2.

As shown in FIG. 5, the coupling part 837 of the assistance force input member 728 is contactable to the coupling part 690 of the rotary member 704 from the downstream side in the first direction D1. Additionally, the rotary member 704 is contactable to the shift control member 288 from the downstream side in the first direction D1. The rotary member 704 is also contactable to a part of the shift control member 288 that is inserted into the coupling hole 686. In the shifting-up action, a rotational force of the shift input member 732 applied in the second direction D2 is configured to be given to the shift control member 288 through the second spring coupling member 724, the second saver spring 716, the first spring coupling member 712, the intermediate member 720 and the assistance force input member 728, and thereby, the shift control member 288 is configured to be rotatable in the second direction D2.

The clutch cam 176 includes a sidewall part 178 and a cam part 179. The sidewall part 178 has an annular shape, and is provided with a through hole through which the axle 36 penetrates. A part of the shift control member 288 is inserted through the through hole of the sidewall part 178. The cam part 179 is provided on the outer peripheral region of the sidewall part 178, and extends in the first axial direction X1. The clutch cam 176 is disposed adjacent to the first sun gear 160 in the first axial direction X1. The cam part 179 extends on the outer peripheral side of the rotary member 704, and is disposed to radially overlap with a part of the rotary member 704 with reference to the axis X. The clutch cam 176 is engaged with the second anti-rotational groove 388 of the axle 36 so as to be non-rotatable about the axis X. The clutch cam 176 can be provided as a part of the first sun gear 160. Alternatively, as shown in FIGS. 6 and 7, the clutch cam 176 can be a member provided separately from the first sun gear 160. As shown in FIG. 4, the cam part 179 of the clutch cam 176 includes at least one first cam surface 180, at least one second cam surface 182 and at least one third cam surface 184. The cam part 179 can include a plurality of first cam surfaces 180, a plurality of second cam surfaces 182 and a plurality of third cam surfaces 184. Here, the cam part 179 includes two of the first cam surfaces 180, two of the second cam surfaces 182 and two of the third cam surfaces 184. The first cam surfaces 180 are disposed rotationally symmetric to each other with respect to the axis X. The second cam surfaces 182 are disposed rotationally symmetric to each other with respect to the axis X. The third cam surfaces 184 are disposed rotationally symmetric to each other with respect to the axis X. Each of the first cam surfaces 180 and each of the third cam surfaces 184 are made in the form of a surface arranged orthogonally to the axis X. Each of the first cam surfaces 180 is disposed closer to the first sun gear 160 than the third cam surface 184. Each of the second cam surfaces 182 is made in the form of a slope connecting each first cam surface 180 and each third cam surface 184.

As shown in FIG. 4, the shift key member 700 is made in the form of an annular member having an inner diameter slightly larger than the outer diameter of the clutch cam 176. The shift key member 700 includes a cam follower 740. The cam follower 740 includes at least one protrusion protruding radially inward from the shift key member 700. The cam follower 740 includes, for instance, two protrusions disposed at equal intervals about the axis X. The cam follower 740 makes contact with the cam part 179 of the clutch cam 176 from the downstream side in the first axial direction X1. The cam follower 740 extends further radially inward than the cam part 179 with reference to the axis X, and is inserted in the guide groove 688 of the rotary member 704. The rotary member 704 is configured to be capable of guiding the shift key member 700 in the axial direction. The shift key member 700 is configured to be moved in the axial direction while being guided in the axial direction along the guide groove 688 of the rotary member 704. The shift key member 700 is configured to be rotated in conjunction with the movement of the shift input member 732. The shift key member 700 is biased in the second axial direction X2 together with the clutch ring 623 by the clutch spring 747, and the cam follower 740 makes contact with the cam part 179. As the rotary member 704 is rotated and then the shift key member 700 is rotated, the clutch cam 176 is configured to axially move the shift key member 700 and the clutch ring 623 between the clutch-on position shown in FIG. 6 and the clutch-off position shown in FIG. 7. As the cam follower 740 makes contact with the first cam surface 180, the clutch ring 623 is configured to be disposed in the clutch-on position. On the other hand, as the cam follower 740 makes contact with the third cam surface 184, the clutch ring 623 is configured to be disposed in the clutch-off position. One of the power transmission paths of the power transmission mechanism 82 is selected by the clutch ring 623, and specifically, either of the planet gear carrier 550 and the first ring gear 551 in the power transmission mechanism 82 is selected as an object to which the rotational force of the input component 70 is transmitted.

The shift control member 288 is configured to be rotated in conjunction with the movement of the shift input member 732, and is configured to select one of the plurality of power transmission paths. The shift control member 288 is mounted to the axle 36 while being rotatable thereabout. The movable range of the shift control member 288 about the axle 36 is equal to that of the shift input member 732 about the axle 36. The shift control member 288 includes a base member 408 and at least one control arm. The base member 408 extends in the axial direction. The at least one control arm extends from the base member 408 in the circumferential direction of the axle 36. When there is a plurality of the at least one control arm, the control arms are disposed at intervals in the axial direction. The at least one control arm includes a first control arm 284, a second control arm 314 and a third control arm 344. The base member 408 includes an inner lateral face 410 and an outer lateral face 412. The outer lateral face 412 is configured to slide against the control sleeve groove provided on the axle 36. The outer lateral face 412 is on the opposite side of the inner lateral face 410. The base member 408 includes a spring coupling part 414 to which the second end 756 of the first saver spring 708 is coupled. The spring coupling part 414 includes a groove provided on a lateral side of a first end 280. The first end 280 of the base member 408 is inserted through the coupling hole 686, and the spring coupling part 414 is disposed inward of the outer peripheral part 682 of the rotary member 704.

The first control arm 284, the second control arm 314 and the third control arm 344 are disposed in the grooves provided on the axle 36, i.e., the first control arm groove 464, the second control arm groove 468 and the third control sleeve groove 472, respectively. The first control arm 284, the second control arm 314 and the third control arm 344 are slidable in the circumferential direction of the axle 36. The first control arm 284 is configured to control the pawl of the second one-way clutch 207 in order to set the second sun gear 164 in either a first state or a second state. The first state of a constituent element refers to a state that the constituent element is non-rotatable in one of the first direction D1 and the second direction D2. In the present exemplary embodiment, the first state of a constituent element refers to a state that the constituent element is non-rotatable in the second direction D2 but is rotatable in the first direction D1. However, the first state of a constituent element can be defined as a state that the constituent element is non-rotatable in both of the first direction D1 and the second direction D2. The second control arm 314 is configured to control the pawl of the third one-way clutch 226 in order to set the third sun gear 168 in either the first state or the second state. The third control arm 344 is configured to control the pawl of the fourth one-way clutch 332 in order to set the fourth sun gear 172 in either the first state or the second state. In the present preferred embodiment, the shift control member 288 is capable of selecting the plurality of power transmission paths by selectively setting at least any one of the second sun gear 164, the third sun gear 168 and the fourth sun gear 172 in the first state and setting the rest of them in the second state.

Shift Assist Mechanism

The torque limit mechanism 950 is configured to limit transmission of a rotational force (torque) from the input component 70 to the shift control member 288 such that an excessive load can be prevented from being applied to the shift mechanism 84 and the shift assist mechanism 90. With this configuration, it is possible to avoid a situation that an excessive load is applied to the shift control member 288 from the shift assist mechanism 90 as the pawl of any one-way clutch cannot be disengaged from the sun gear and thereby the shift control member 288 cannot be rotated.

Figure 10:
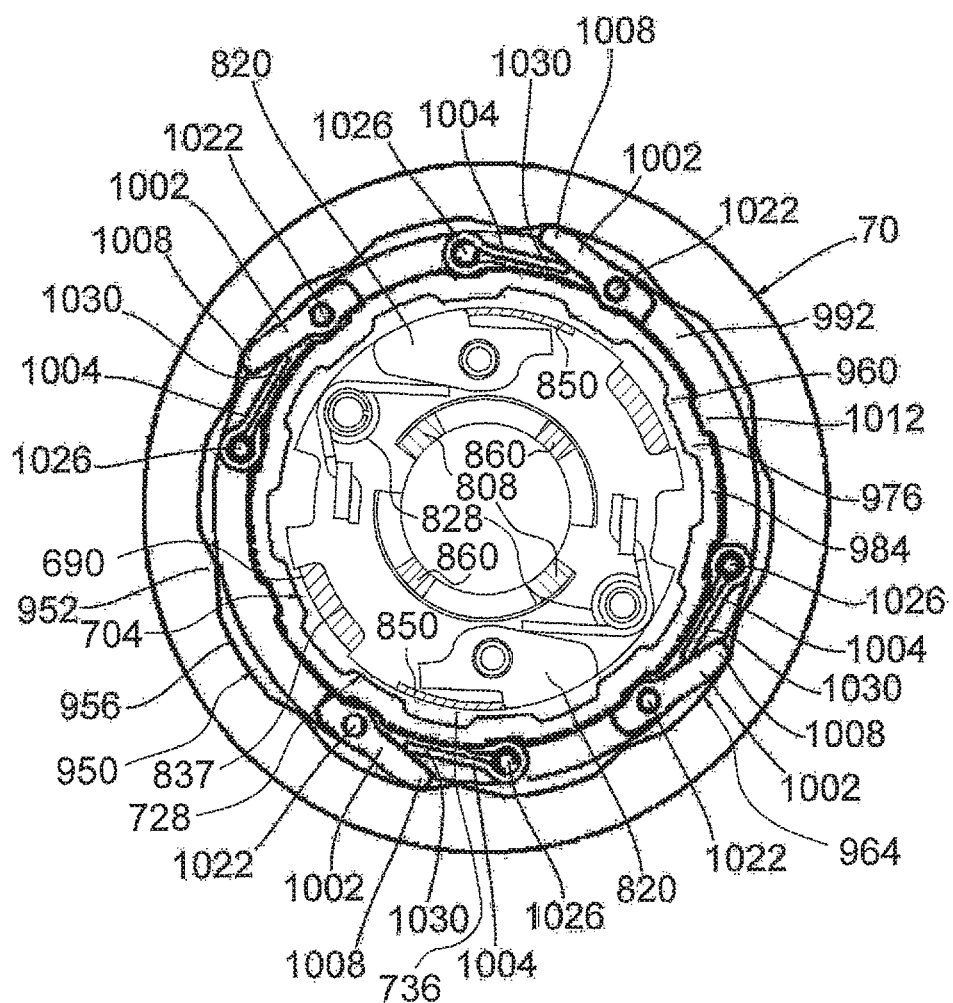
FIG. 10 is a cross-sectional view of the shift assist mechanism taken along section line X-X in FIG. 6 and shows an operation disabled state of the shift assist mechanism.
Figure 11:
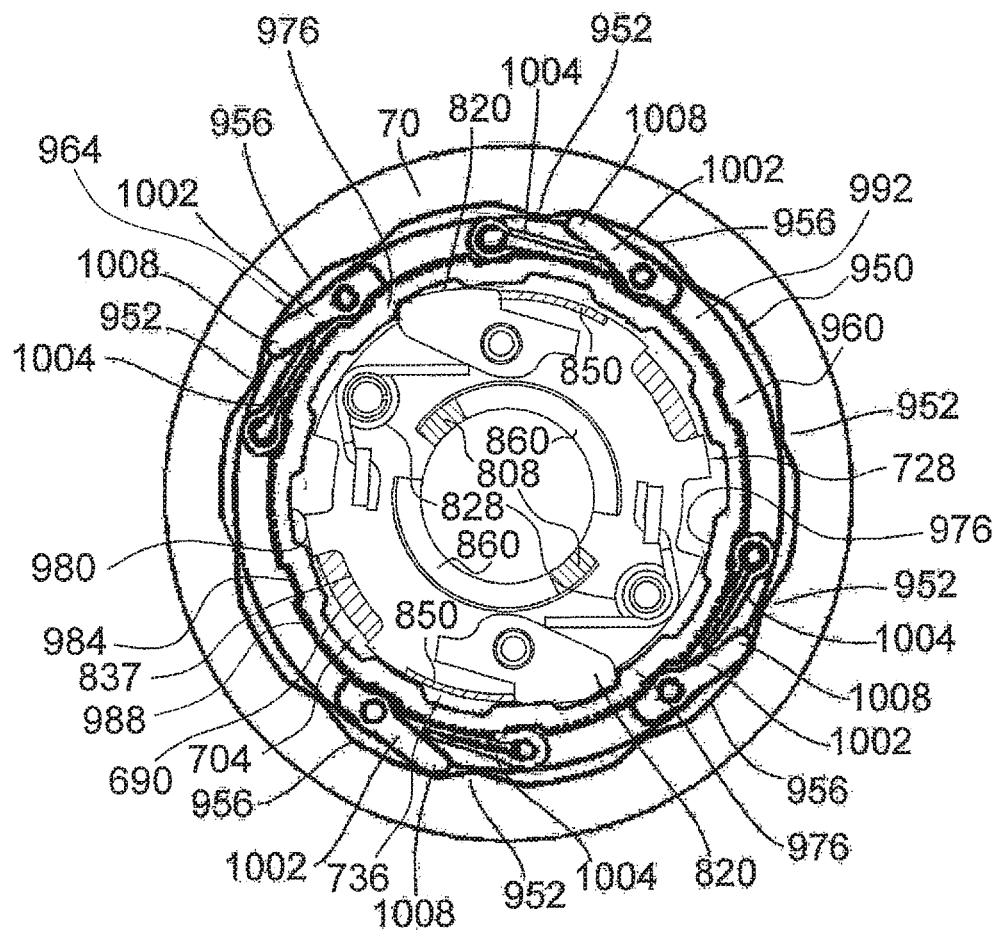
FIG. 11 is a cross-sectional view of the shift assist mechanism taken along section line X-X in FIG. 6 and shows an operation enabled state of the shift assist mechanism.
Figure 12:
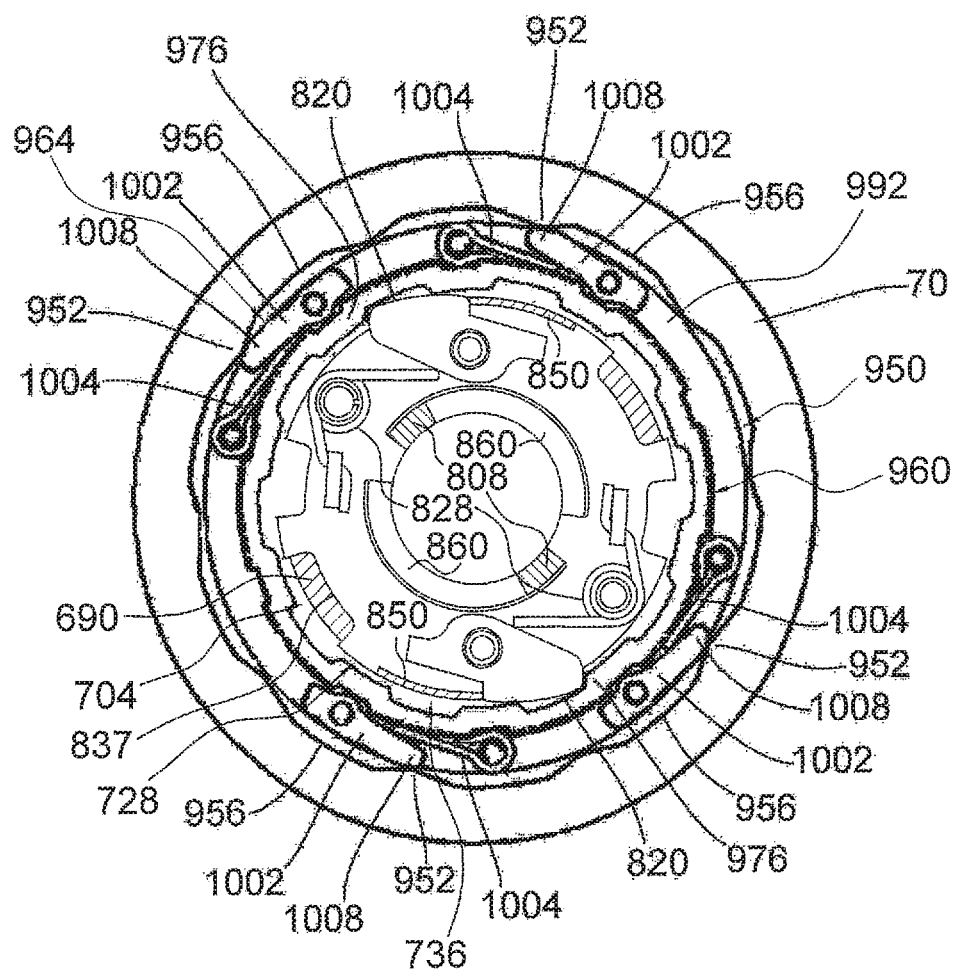
FIG. 12 is a cross-sectional view of the shift assist mechanism taken along section line X-X in FIG. 6.

As shown in FIGS. 6, 7 and 10, the torque limit mechanism 950 includes the tubular member 960 and an engagement unit 964. The tubular member 960 is disposed radially outside the assistance force input member 728 with reference to the axis X, while being disposed radially inside the input component 70 with reference to the axis X. The tubular member 960 faces the pawl members 820. The input component 70 is provided with at least one recess 956 on its inner peripheral part 952. The input component 70 is provided with a plurality of recesses 956 on the inner peripheral part 952. The recesses 956 are aligned in the circumferential direction of the input component 70. The tubular member 960 is provided with the ratchet teeth 976 on its inner peripheral part. The tubular member 960 is provided with a coupling spline 984 on its outer peripheral part. The coupling spline 984 extends in the axial direction of the tubular member 960. The coupling spline 984 includes a single or plurality of splines.

The engagement unit 964 is provided on the outer peripheral part of the tubular member 960. The engagement unit 964 includes a support portion 992, an engaging member 1002 and a biasing member 1004. The support portion 992 is attached to the tubular member 960 while being non-rotatable about the axis X with respect to the tubular member 960. The support portion 992 includes a pair of annular plates disposed at an interval in the axial direction. The engaging member 1002 includes at least one pawl, and in the present exemplary embodiment, includes four pawls. The biasing member 1004 includes at least one spring (e.g., a coil spring, a flat spring, etc.). The biasing member 1004 biases an engagement tip 1008 of the engaging member 1002 radially outward with reference to the axis X. As shown in FIG. 10, the support portion 992 includes a coupling spline 1012, a first pin support part 1020 and a second pin support part 1024. The coupling spline 1012 includes a single spline or a plurality of splines that are provided on the inner peripheral part of the support portion 992 and extend in the axis X. The coupling spline 1012 is coupled to the coupling spline 984 that are provided on the outer peripheral part of the tubular member 960 and includes a single spline or a plurality of splines. The tubular member 960 and the support portion 992 can be produced as an integrated member. The first pin support part 1020 includes holes for supporting first pins 1022. The holes are provided in each of the pair of annular plates of the support portion 992. The second pin support part 1024 includes holes for supporting second pins 1026. The holes are provided in each of the pair of annular plates of the support portion 992. The first pins 1022 and the second pins 1026 couple the pair of annular plates of the support portion 992. Each of the pawls of the engaging member 1002 is rotatably supported by each of the first pins 1022 while being interposed between the pair of annular plates of the support portion 992. Each of the springs of the biasing member 1004 includes a first end (not shown in the drawings) and a second end 1030. The first end is wound about each of the second pins 1026 and makes contact with either the support portion 992 or the tubular member 960, whereas the second end 1030 makes contact with each of the pawls of the engaging member 1002. In each of the pawls of the engaging member 1002, the engagement tip 1008 is disposed on the upstream side of the first pin 1022 in the first direction D1. In each of the pawls of the engaging member 1002, the engagement tip 1008 is pressed by each of the spring of the biasing member 1004 and makes contact with the inner peripheral surface of the input component 70. In each of the pawls of the engaging member 1002, the engagement tip 1008 is fitted to one of the recesses 956 of the input component 70. As gear shifting is not being performed, the input component 70 and the tubular member 960 are integrally rotatable while being prevented from relatively rotating by the engaging member 1002. As the input component 70 is given a predetermined rotational force in the first direction D1 while the tubular member 960 is not being rotated, each of the pawls of the engaging member 1002 is configured to be disengaged from one of the recesses 956 of the input component 70, and the input component 70 is configured to be rotated relatively to the tubular member 960 in the first direction D1.

The pawl control member 736 is made in the form of an annular member. The pawl control member 736 includes a base part 736A and a pawl control protrusion 850. The pawl control protrusion 850 extends from the outer peripheral region of the base part 736A in the axial direction. The pawl control member 736 is disposed adjacent to the assistance force input member 728 in the first axial direction X1. The pawl control protrusion 850 is provided in a corresponding position to each pawl member 820. The pawl control protrusion 850 includes a single or plurality of protrusions, and herein, includes two protrusions. As gear shifting is not being performed, each of the protrusions of the pawl control protrusion 850 is configured to press each pawl member 820 to the second position. The pawl control member 736 is restricted from moving in the first direction D1 by the intermediate member 720. As the intermediate member 720 is rotated in the first direction D1, the pawl control member 736 is configured to be rotated in the first direction D1 in conjunction with movement of each of the pawl members 820 from the second position to the first position. As the assistance force input member 728 is rotated in the first direction D1 while each of the pawl members 820 is disposed in the first position and the intermediate member 720 is stopped rotating, the pawl control member 736 is configured to move each of the pawl members 820 from the first position to the second position. As moved to the first position, each of the pawl members 820 is configured to be engaged with the ratchet teeth 976 of the tubular member 960 (see FIG. 11).

The pawl control member 736 is provided with an opening 854. The base part 736A has an annular shape. In other words, the opening 854 is provided in the base part 736A. The shift input member 732 is inserted through the opening 854 of the pawl control member 736. The pawl control member 736 is rotatably supported by the shift input member 732. The pawl control member 736 includes a second engaging part 856 for restricting the rotational range of the pawl control member 736. The second engaging part 856 protrudes radially inward from the inner peripheral region of the base part 736A. The first coupling part 808 of the intermediate member 720 is configured to make contact with the second engaging part 856. The first coupling part 808 makes contact with the pawl control member 736 from the upstream side in the second direction D2. The pawl control member 736 is disposed at an interval from the shift input member 732 so as not to make contact with the shift input member 732 from the upstream side in the first direction D1 as rotated in the first direction D1.

Figure 8:
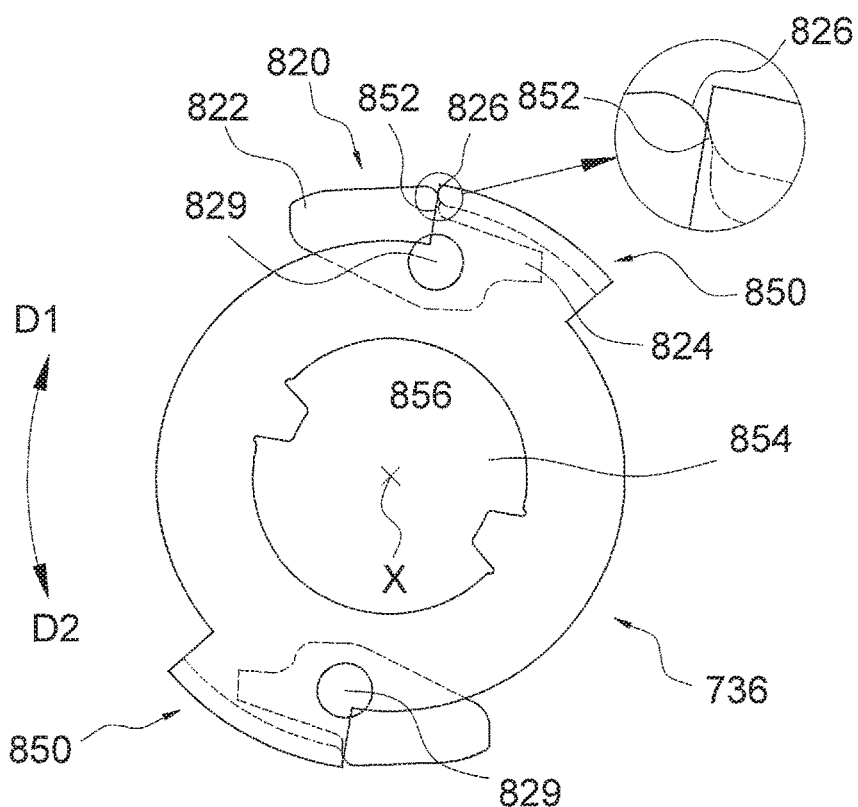
FIG. 8 is a side view of a condition that a pawl control member presses pawl members to second positions.
Figure 9:
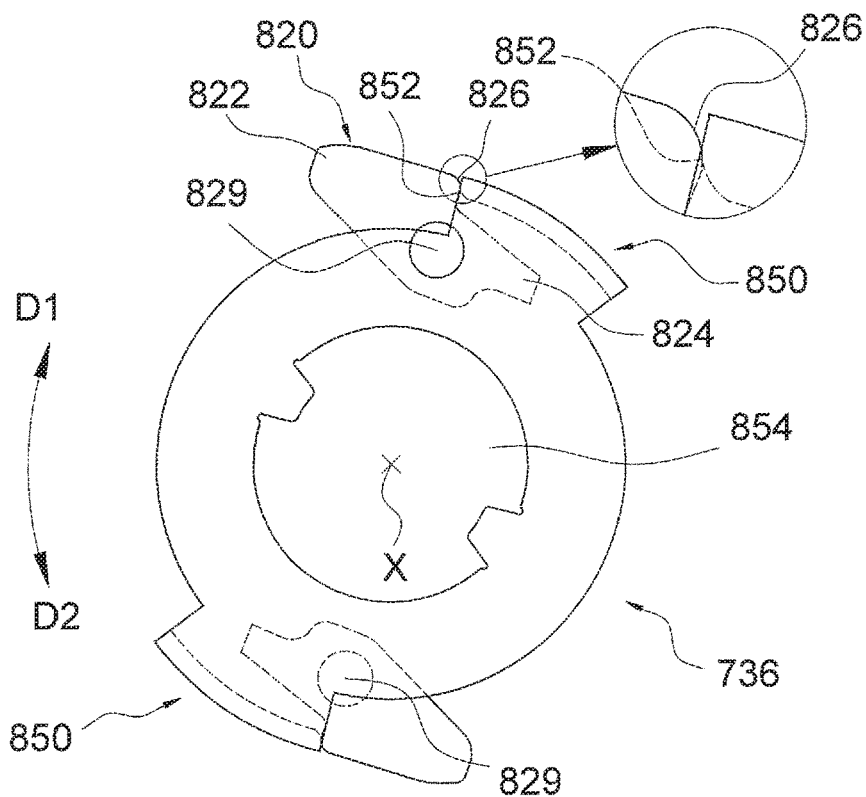
FIG. 9 is a side view of a condition that the pawl biasing member biases the pawl members toward first positions.

As shown in FIGS. 8 and 9, each protrusion of the pawl control protrusion 850 includes a first contact part 852 configured to make contact with each pawl member 820. The first contact part 852 is provided on an end of each protrusion of the pawl control protrusion 850, i.e., an end located on the downstream side in the second direction D2. The first contact part 852 is provided on a radially inner part of each protrusion of the pawl control protrusion 850 with reference to the axis X. The first contact part 852 curves in an outwardly convex shape as seen in a cross section taken perpendicularly to the axis X.

Each of the pawl members 820 includes a second contact part 826 configured to make contact with the first contact part 852. Each of the pawl members 820 is provided with a step on its outer peripheral part. The step is located between the tip end 822 and the base end 824 in a radially outer region of the outer peripheral part with reference to the axis X. At the step, the tip end 822-side part is shifted radially outward than the base end 824-side part with reference to the axis X. The second contact part 826 is provided on the step. A part of the step, located radially outside with reference to the axis X, is provided as the second contact part 826 and curves in an outwardly convex shape as seen in a cross section taken perpendicularly to the axis X.

As the shift input member 732 is rotated in the first direction D1, the intermediate member 720 is also configured to be rotated in the first direction D1. As the intermediate member 720 is rotated in the first direction D1, the pawl control member 736, the rotational position of which is restricted by the intermediate member 720, becomes rotatable relatively to the assistance force input member 728 in the first direction D1. As the pawl control member 736 becomes rotatable relatively to the assistance force input member 728 in the first direction D1, each of the pawl members 820 biased by each of the pawl biasing members 828 is configured to move each protrusion of the pawl control protrusion 850 in the first direction D1 while making contact therewith, and simultaneously, pivots to the first position and is meshed with the ratchet teeth 976 of the tubular member 960. Under the condition, as the input component 70 is rotated in the first direction D1, a rotational force is configured to be transmitted to the assistance force input member 728 from the input component 70, and the shift control member 288 can be rotated through the rotary member 704.

As the shift input member 732 is stopped rotating in the first direction D1, the intermediate member 720 is also stopped rotating in the first direction D. As the intermediate member 720 is also stopped rotating in the first direction D1, the rotational position of the pawl control member 736 is restricted by the intermediate member 720, and the pawl control member 736 becomes non-rotatable relatively to the assistance force input member 728 in the first direction D1. Under the condition, as the assistance force input member 728 is rotated in the first direction D1, each protrusion of the pawl control protrusion 850 is configured to press each of the pawl members 820 toward the second position. As a result, each of the pawl members 820 is moved to the second position against the biasing force by each of the pawl biasing members 828. The assistance force input member 728 is configured to be rotated relatively to the pawl control member 736 in the first direction D1 as the assistance force input member 728 is given a rotational force applied in the first direction D from the input component 70 or as the shift control member 288 is rotated in the first direction through the intermediate member 720, the first spring coupling member 712 and the first saver spring 708, and accordingly, the shift input member 732 is pressed in the first direction D1 by the shift control member 288 through the rotary member 704.

Gear Shifting Action of Internal Transmission

Next, a gear shifting action of the internal transmission 14 will be explained. Table 1 shows engagement/disengagement conditions of various components in respective gear stages, whereas Table 2 shows the power transmission paths in the respective gear stages. Values of a gear ratio are exemplary only.

TABLE 1

| GEAR STAGES | CLUTCH RING 623 | $2^{ND}$ SUN GEAR 164 | $3^{RD}$ SUN GEAR 168 | $4^{TH}$ SUN GEAR 172 | GEAR RATIO |
|---|---|---|---|---|---|
| 1 (LOW SPEED) | DISENGAGED | $2^{ND}$ STATE | $2^{ND}$ STATE | $2^{ND}$ STATE | 0.53 |
| 2 | DISENGAGED | $2^{ND}$ STATE | $2^{ND}$ STATE | $1^{ST}$ STATE | 0.64 |
| 3 | DISENGAGED | $2^{ND}$ STATE | $1^{ST}$ STATE | $2^{ND}$ STATE | 0.74 |
| 4 | DISENGAGED | $1^{ST}$ STATE | $2^{ND}$ STATE | $2^{ND}$ STATE | 0.85 |
| 5 | ENGAGED | $2^{ND}$ STATE | $2^{ND}$ STATE | $2^{ND}$ STATE | 1.0 |
| 6 | ENGAGED | $2^{ND}$ STATE | $2^{ND}$ STATE | $1^{ST}$ STATE | 1.22 |
| 7 | ENGAGED | $2^{ND}$ STATE | $1^{ST}$ STATE | $2^{ND}$ STATE | 1.42 |
| 8 (HIGH SPEED) | ENGAGED | $1^{ST}$ STATE | $2^{ND}$ STATE | $2^{ND}$ STATE | 1.62 |

TABLE 2

| GEAR STAGES | POWER TRANSMISSION PATHS |
|---|---|
| 1 | INPUT COMPONENT 70 → $1^{ST}$ ONE-WAY CLUTCH 586 → $1^{ST}$ RING GEAR 551 → PLANET GEAR CARRIER 550 (ROTATION OF PLANET GEAR 579 ABOUT $1^{ST}$ SUN GEAR 160) → $2^{ND}$ ONE-WAY CLUTCH 207 → OUTPUT COMPONENT 74 |
| 2 | INPUT COMPONENT 70 → $1^{ST}$ ONE-WAY CLUTCH 586 → $1^{ST}$ RING GEAR 551 → PLANET GEAR CARRIER 550 (ROTATION OF PLANET GEAR 579 ABOUT $1^{ST}$ SUN GEAR 160 AND THEN ROTATION OF PLANET GEAR 608 ABOUT $4^{TH}$ SUN GEAR 172) → $2^{ND}$ RING GEAR 553 → $6^{TH}$ ONE-WAY CLUTCH 628 → OUTPUT COMPONENT 74 |
| 3 | INPUT COMPONENT 70 → $1^{ST}$ ONE-WAY CLUTCH 586 → $1^{ST}$ RING GEAR 551 → PLANET GEAR CARRIER 550 (ROTATION OF PLANET GEAR 579 ABOUT $1^{ST}$ SUN GEAR 160 AND THEN ROTATION OF PLANET GEAR 608 ABOUT $3^{RD}$ SUN GEAR 168) → $2^{ND}$ RING GEAR 553 → $6^{TH}$ ONE-WAY CLUTCH 628 → OUTPUT COMPONENT 74 |
| 4 | INPUT COMPONENT 70 → $1^{ST}$ ONE-WAY CLUTCH 586 → $1^{ST}$ RING GEAR 551 → PLANET GEAR CARRIER 550 (ROTATION OF PLANET GEAR 579 ABOUT $1^{ST}$ SUN GEAR 160 AND THEN ROTATION OF PLANET GEAR 608 ABOUT $2^{ND}$ SUN GEAR 164) → $2^{ND}$ RING GEAR 553 → $6^{TH}$ ONE-WAY CLUTCH 628 → OUTPUT COMPONENT 74 |
| 5 | INPUT COMPONENT 70 → CLUTCH RING 623 → PLANET GEAR CARRIER 550 → $5^{TH}$ ONE-WAY CLUTCH 908 → OUTPUT COMPONENT 74 |

TABLE 2-continued

| GEAR STAGES | POWER TRANSMISSION PATHS |
|---|---|
| 6 | INPUT COMPONENT 70 → CLUTCH RING 623 → PLANET GEAR CARRIER 550 (ROTATION OF PLANET GEAR 608 ABOUT $4^{TH}$ SUN GEAR 172) → $2^{ND}$ RING GEAR 553 → $6^{TH}$ ONE-WAY CLUTCH 628 → OUTPUT COMPONENT 74 |
| 7 | INPUT COMPONENT 70 → CLUTCH RING 623 → PLANET GEAR CARRIER 550 (ROTATION OF PLANET GEAR 608 ABOUT $3^{RD}$ SUN GEAR 168) → $2^{ND}$ RING GEAR 553 → $6^{TH}$ ONE-WAY CLUTCH 628 → OUTPUT COMPONENT 74 |
| 8 | INPUT COMPONENT 70 → CLUTCH RING 623 → PLANET GEAR CARRIER 550 (ROTATION OF PLANET GEAR 608 ABOUT $2^{ND}$ SUN GEAR 164) → $2^{ND}$ RING GEAR 553 → $6^{TH}$ ONE-WAY CLUTCH 628 → OUTPUT COMPONENT 74 |

Actions of Shift Mechanism and Shift Assist Mechanism

As described above, the shift assist mechanism 90 is configured to assist the shift mechanism 84 to switch among the power transmission paths in the power transmission mechanism 82 with use of the rotational force of the input component 70. Actions of the shift mechanism 84 and the shift assist mechanism 90 will be explained with reference to schematic diagrams of FIGS. 13 to 15. The shift assist mechanism 90 is configured to perform shifting assistance only as the input component 70 is being rotated. In the shifting-up action, the shift assist mechanism 90 is configured not to perform shifting assistance.

Shifting-Down Action without Shifting Assistance

Figure 13:
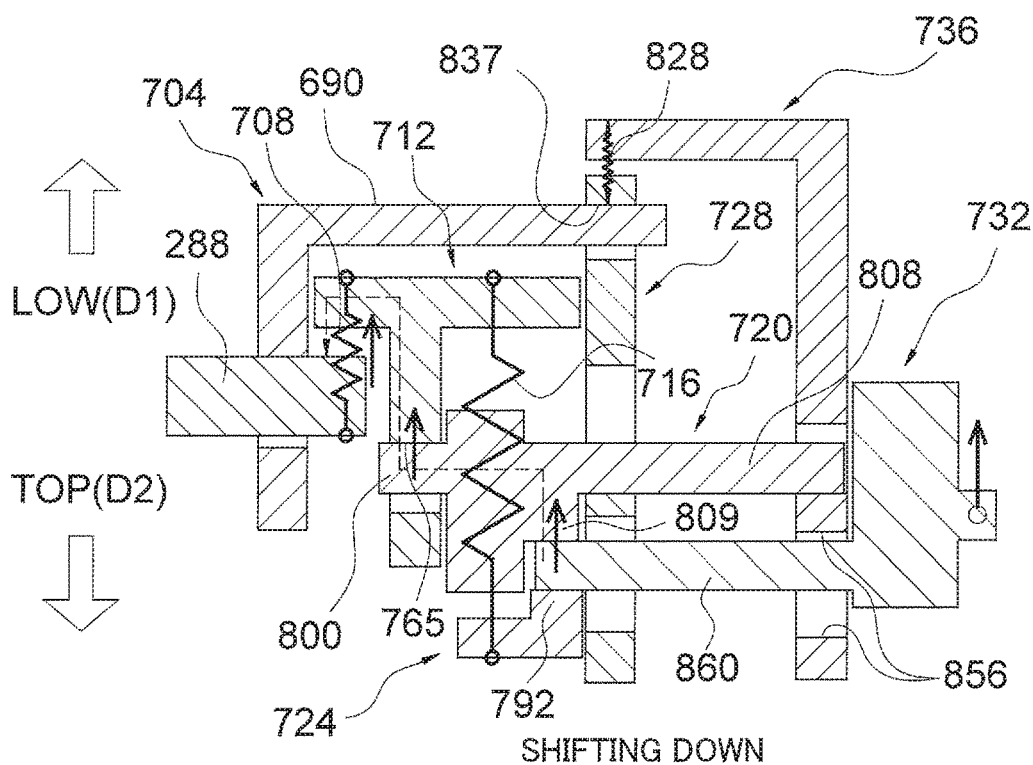
FIG. 13 is a schematic diagram for explaining a shifting-down action of the shift mechanism.

A shifting-down action will be explained that is configured to be performed as the input component 70 is not being rotated and gear shifting is enabled only by the drive force of the drive unit 91. As the shifting-down action is performed such that the gear ratio reduces in a stepwise manner as shown in Table 1, the output shaft 99 of the drive unit 91 rotates the transmission member 104 at a predetermined angle in the first direction D1 as shown in FIG. 13. Accordingly, the shift input member 732 engaged with the transmission member 104 is rotated at the predetermined angle in the first direction D1. As the shift input member 732 is rotated at the predetermined angle in the first direction D1, the second coupling part 860 of the shift input member 732 presses the second coupling part 809 of the intermediate member 720 in the first direction D1, and thereby, the intermediate member 720 is rotated at the predetermined angle in the first direction D1. As the intermediate member 720 is rotated at the predetermined angle in the first direction D1, the third coupling part 800 of the intermediate member 720 presses the coupling part 765 of the first spring coupling member 712 in the first direction D1, and thereby, the first spring coupling member 712 is rotated at the predetermined angle in the first direction D1. As the first spring coupling member 712 is rotated at the predetermined angle, the shift control member 288 is pulled through the first saver spring 708 in the first direction D1. As herein rotatable in the first direction D1, the shift control member 288 is rotated at the predetermined angle in the first direction D1, and simultaneously, presses the rotary member 704 in the first direction D1 whereby the rotary member 704 is rotated at the predetermined angle in the first direction D1. As the shift control member 288 is rotated in the first direction D1, one of the second, third and fourth sun gears 164, 168 and 172 is selectively set in the first state, or all of the second, third and fourth sun gears 164, 168 and 172 are set in the second state. In shifting down the fifth gear stage to the fourth gear stage, the shift key member 700 axially moves the clutch ring 623 from the clutch-on position to the clutch-off position in conjunction with the rotation of the rotary member 704 in the first direction D1. As the shift input member 732 is rotated in the first direction D1 and the shift control member 288 is rotated in the first direction D1 by the same amount as the shift input member 732, relative positions between the rotary member 704 and the pawl control member 736 are not changed in the rotational direction. Hence, each pawl member 820 is kept held in the second position and the shift assist mechanism 90 does not operate.

Shifting-Up Action

Figure 14:
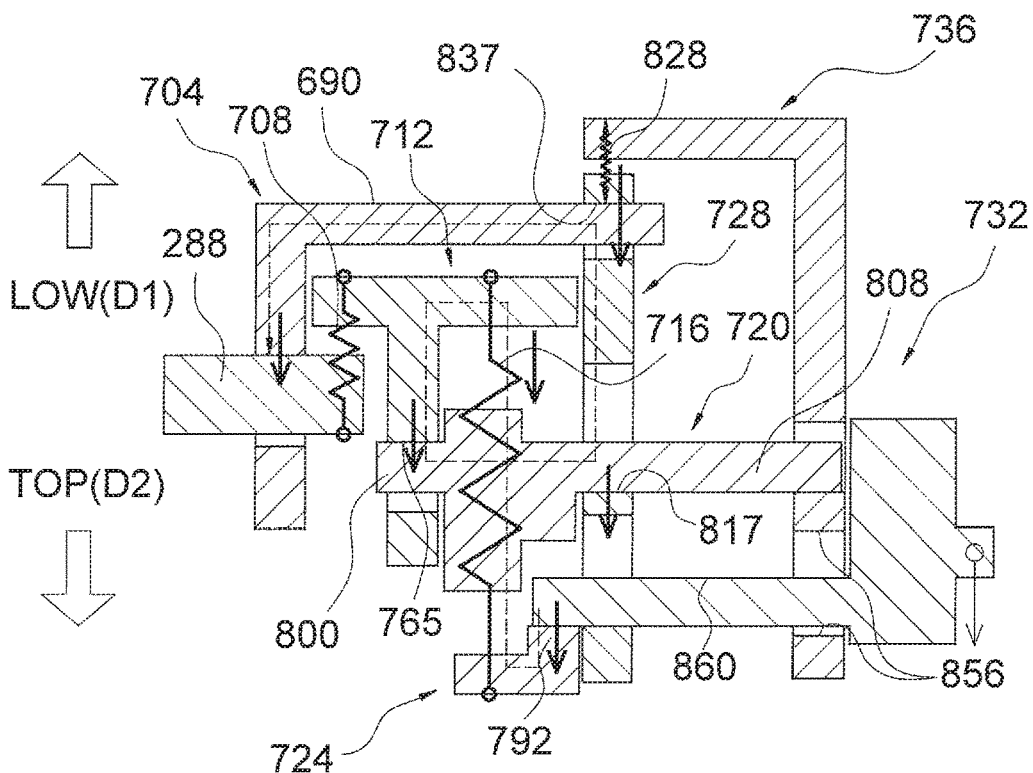
FIG. 14 is a schematic diagram for explaining a shifting-up action of the shift mechanism.
Figure 15:
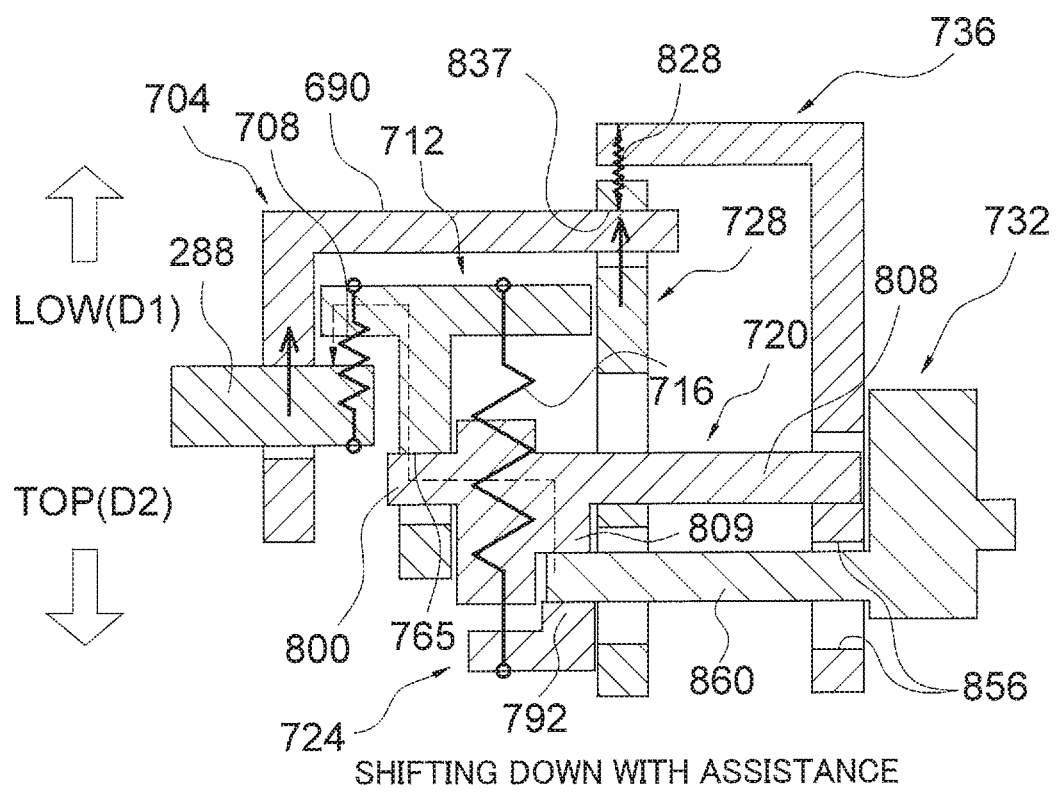
FIG. 15 is a schematic diagram for explaining the shifting-down action with assistance of the shift assist.

As the shifting-up action is performed such that the gear ratio increases in a stepwise manner as shown in Table 1, the output shaft 99 of the drive unit 91 rotates the transmission member 104 at a predetermined angle in the second direction D2 as shown in FIG. 14. Accordingly, the shift input member 732 engaged with the transmission member 104 is rotated at the predetermined angle in the second direction D2. As the shift input member 732 is rotated at the predetermined angle in the second direction D2, the second coupling part 860 of the shift input member 732 presses the second engaging part 792 of the second spring coupling member 724 in the second direction D2, and thereby, the second spring coupling member 724 is rotated at the predetermined angle in the second direction D2. As the second spring coupling member 724 is rotated at the predetermined angle in the second direction D2, the first spring coupling member 712 is rotated through the second saver spring 716 at the predetermined angle in the second direction D2. As the first spring coupling member 712 is rotated at the predetermined angle in the second direction D2, the coupling part 765 of the first spring coupling member 712 presses the third coupling part 800 of the intermediate member 720 in the second direction D2, and thereby, the intermediate member 720 is rotated at the predetermined angle in the second direction D2. As the intermediate member 720 is rotated at the predetermined angle in the second direction D2, the first coupling part 808 of the intermediate member 720 presses the first engaging part 817 of the assistance force input member 728 and the second engaging part 856 of the pawl control member 736 in the second direction D2, and thereby, the assistance force input member 728 and the pawl control member 736 are rotated at the predetermined angle in the second direction D2. As the assistance force input member 728 is rotated at the predetermined angle in the second direction D2, the coupling part 837 of the assistance force input member 728 presses the coupling part 690 of the rotary member 704 in the second direction D2, and thereby, the rotary member 704 is rotated at the predetermined angle in the second direction D2. As a result, the shift control member 288 is rotated at the predetermined angle in the second direction D2. Accordingly, one of the second, third and fourth sun gears 164, 168 and 172 is selectively set in the first state, or all of the second, third and fourth sun gears 164, 168 and 172 are set in the second state. Moreover, in shifting up the fourth gear stage to the fifth gear stage, the shift key member 700 axially moves the clutch ring 623 from the clutch-off position to the clutch-on position.

Shifting-Down Action with Shifting Assistance

A shifting-down action will be explained that is configured to be performed as the input component 70 is being rotated and gear shifting is not enabled only by the drive force of the drive unit 91. It is herein supposed that as the shift input member 732 is rotated at a predetermined angle in the first direction D1, the shift control member 288 is not rotated at the same angle as the shift input member 732 in the first direction D1. The intermediate member 720 is herein rotated together with the shift input member 732 at the predetermined angle in the first direction D1. Hence, the position in which the intermediate member 720 makes contact with the pawl control member 736 is also moved in the first direction D1. The pawl control member 736 is pressed by each of the pawl members 820 and is rotated relatively to the rotary member 704 in the first direction D1. As the input component 70 is given a large rotational force, any of the pawls of the second, third and fourth one-way clutches 207, 226 and 332 inevitably gets stuck with the corresponding one of the second, third and fourth sun gears 164, 168 and 172. Thus, chances are that the shift control member 288 is not rotated in the first direction D1 only by the drive force of the drive unit 91. In such a case, the pawl control member 736 is rotated relatively to the rotary member 704 in the first direction D1. As the pawl control member 736 is rotated relatively to the assistance force input member 728 in the first direction D1, each of the pawl members 820 is moved to the first position and is engaged with the ratchet teeth 976 of the tubular member 960. As the input component 70 is being rotated, the rotation of the input component 70 in the first direction D1 is transmitted through the torque limit mechanism 950 and then through each of the pawl members 820 to the assistance force input member 728. As the assistance force input member 728 is rotated in the first direction D1, the shift control member 288 is pressed and rotated in the first direction D1 through the rotary member 704. As the shift input member 732 is rotated at the predetermined angle in the first direction D1 and is then stopped rotating, the intermediate member 720 is also stopped rotating in the first direction D1. Accordingly, the intermediate member 720 restricts the pawl control member 736 from moving in the first direction D1. Then, the shifting-down action is completed as the shift control member 288 is rotated at the predetermined angle in the first direction D1 by the assistance force input member 728 through the rotary member 704 while the pawl control member 736 is restricted from moving in the first direction D1. As rotated at the predetermined angle in the first direction D1, the assistance force input member 728 is rotated relatively to the pawl control member 736 in the first direction D1. As the assistance force input member 728 is rotated relatively to the pawl control member 736 in the first direction D1, each pawl of the members 820 is pressed by the pawl control member 736 and is returned from the first position to the second position. The aforementioned action is configured to be performed unless the torque limit mechanism 950 limits the rotational force to be transmitted from the input component 70 to the shift control member 288. As rotated in the first direction D1, the pawl control member 736 does not make contact with the shift input member 732 from the upstream side in the first direction D1. Hence, the rotational force is not transmitted from the pawl control member 736 to the shift input member 732.

Other Exemplary Embodiments

One exemplary embodiment of the present invention has been explained above. However, the present invention is not limited to the above, and a variety of changes can be made without departing from the scope of the present invention. Especially, a plurality of embodiments and modifications described in the present specification can be arbitrarily combined on an as-needed basis.

(a) In the aforementioned exemplary embodiment, the power transmission mechanism 82 of the internal transmission 14 has been disclosed as having eight power transmission paths. However, the number of the power transmission paths can be arbitrarily set as long as there are a plurality of paths (e.g., any of the numbers from two to twelve).

(b) In the aforementioned exemplary embodiment, the controller 97 is configured to be controlled in response to an operation of the gear shifter connected thereto through the electric cable. However, the controller 97 can be connected to the gear shifter with wireless technologies. For example, the controller 97 can be connected to the gear shifter with a low-power wireless communication standard. Additionally or alternatively, the controller 97 can be configured to perform automatic gear shifting by controlling the electric actuator based on at least any of detection results by a vehicle velocity sensor for detecting the vehicle velocity of the bicycle, a cadence sensor for detecting the rotational velocity of a crank, a sensor for detecting a manual drive force acting on the crank, and so forth.

(c) In the aforementioned exemplary embodiment, the internal gear hub has been disclosed as the bicycle transmission. However, the bicycle transmission of the present invention is not limited to this arrangement. The present invention is applicable to a type of transmission configured to change the velocity of rotation of a crank axle and then transmit the velocity changed rotation to a front sprocket.

(d) In the aforementioned exemplary embodiment, a member with protrusions and a member with recesses are configured to be contactable to each other. However, the member with protrusions can be provided with recesses instead of the protrusions, whereas the member with recesses can be provided with protrusions instead of the recesses. Thus, the alternatively provided protrusions and the alternatively provided recesses can be configured to be contactable to each other.

(e) In the aforementioned exemplary embodiment, one of the power transmission paths is changed to another such that the shifting-down action is performed as the shift input member 732 is rotated in the first direction D1. However, one of the power transmission paths can be configured to be changed to another such that the shifting-up action is performed as the shift input member 732 is rotated in the first direction D1.

(f) In the aforementioned exemplary embodiment, the shift input member 732 is configured to be rotated by the motor 93. However, the gear shifter and the shift mechanism can be connected through two cables, i.e., a shifting-up cable and a shifting-down cable. For example, the shift input member can be configured to be rotated in the first direction D1 through the shifting-down cable and be rotated in the second direction D2 through the shifting-up cable.

(g) In the aforementioned exemplary embodiment, the torque limit mechanism 950 can be made in the form of a multi-plate clutch mechanism.

(h) In the aforementioned exemplary embodiment, the transmission member 104 may not be provided, and the shift input member 732 can be configured to be directly given the rotational force of the drive unit 91.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle transmission, comprising:
   an axle;
   an input component rotatably supported by the axle to receive a rotational force manually applied thereto;
   an output component rotatably supported by the axle;
   a power transmission mechanism configured to transmit the rotational force of the input component to the output component through any one of a plurality of power transmission paths, the power transmission mechanism being configured to change a rotational velocity of the output component with respect to a rotational velocity of the input component;
   a shift mechanism including a shift input member, a shift control member, a first saver spring and a second saver spring, the shift input member configured to be set in a plurality of rotational positions about the axle, the shift control member being rotated in conjunction with movement of the shift input member so as to select any one of the plurality of power transmission paths, the shift control member receiving the rotational force applied in a first direction about the axle through the first saver spring as the shift input member is rotated in the first direction; and
   a shift assist mechanism configured to transmit the rotational force applied in the first direction by the input component to a shifting force transmission path between the second saver spring and the shift control member as the shift input member is rotated in the first direction.

2. The bicycle transmission according to claim 1, wherein the shift mechanism includes an electric actuator configured to rotate the shift input member.

3. The bicycle transmission according to claim 2, wherein the electric actuator is a motor.

4. The bicycle transmission according to claim 3, wherein the shift mechanism includes a speed reducer configured to decelerate rotation of the motor and transmit decelerated rotation to the shift input member.

5. The bicycle transmission according to claim 3, wherein the motor is configured to be detachably attached to the axle.

6. The bicycle transmission according to claim 2, wherein the shift mechanism includes a controller controlling the electric actuator so as to set the shift input member in any one of the plurality of rotational positions.

7. The bicycle transmission according to claim 6, wherein the shift mechanism includes a housing for accommodating the motor, and
   the controller is provided to the housing.

8. The bicycle transmission according to claim 1, wherein the shift mechanism includes:
   an intermediate member to which the shift input member is contactable from an upstream side in the first direction, the intermediate member being disposed between the shift input member and the shift control member,
   a first spring coupling member to which the intermediate member is contactable from the upstream side in the first direction, and a second spring coupling member contactable to the shift input member from the upstream side in the first direction, the first saver spring is coupled to the first spring coupling member and the shift control member, the first saver spring biasing the first spring coupling member in a second direction, the first saver spring biasing the shift control member in the first direction, and the second saver spring is coupled to the first spring coupling member and the second spring coupling member, the second saver spring biasing the first spring coupling member in the second direction, the second saver spring biasing the second spring coupling member in the first direction.

9. The bicycle transmission according to claim 8, wherein as the shift input member is rotated in the first direction, the shift input member is configured to press the intermediate member in the first direction so as to cause the intermediate member to press the first spring coupling member in the first direction.

10. The bicycle transmission according to claim 8, wherein
the shift mechanism includes
an assistance force input member to which the intermediate member is contactable from a downstream side in the first direction and to which the rotational force is configured to be inputted from the shift assist mechanism, and
a rotary member to which the assistance force input member is contactable from the downstream side in the first direction, the rotary member being contactable to the shift control member from the downstream side in the first direction, the rotary member being rotatably mounted about the axle.

11. The bicycle transmission according to claim 10, wherein
as the shift input member is rotated in the second direction:
the shift input member presses the second spring coupling member in the second direction;
the first spring coupling member presses the intermediate member in the second direction;
the intermediate member presses the assistance force input member in the second direction; and
the rotary member presses the shift control member in the second direction.

12. The bicycle transmission according to claim 10, wherein
the shift assist mechanism includes
a tubular member movable in conjunction with the input component, the tubular member being provided with ratchet teeth on an inner peripheral surface thereof, the ratchet teeth being aligned at intervals in a circumferential direction,
at least one pawl member mounted to the assistance force input member so as to be movable to a first position and a second position, the at least one pawl member being engageable with the ratchet teeth in the first position, the at least one pawl member being disengageable from the ratchet teeth in the second position,
at least one biasing member mounted to the assistance force input ember so as to bias the at least one pawl member toward the first position, and
a pawl control member restricted from moving in the first direction by the intermediate member, the pawl control member being rotated in the first direction in conjunction with movement of the at least one pawl member from the second position to the first position as the intermediate member is rotated in the first direction, the pawl control member being configured to move the at least one pawl member from the first position to the second position as the assistance force input member is rotated in the first direction while the at least one pawl member is disposed in the first position and the intermediate member is not in motion.

13. The bicycle transmission according to claim 12, wherein
the pawl control member is disposed at an interval from the shift input member so as not to make contact with the shift input member from the upstream side in the first direction as rotated in the first direction.

14. The bicycle transmission according to claim 12, wherein
the at least one pawl member is pivotally mounted to the assistance force input member so as to pivot about an axis arranged parallel to the axle.

15. The bicycle transmission according to claim 12, wherein
as the rotational force is inputted to the assistance force input member from the shift assist mechanism, the assistance force input member presses the rotary member in the first direction and the rotary member presses the shift control member in the first direction.

16. The bicycle transmission according to claim 12, wherein
the shift assist mechanism includes a torque limit mechanism, the torque limit mechanism being mounted between the input component and the tubular member, the torque limit mechanism limiting a torque to be transmitted to the tubular member.

17. The bicycle transmission according to claim 1, wherein
the power transmission mechanism changes the selected one of the plurality of power transmission paths to another in the plurality of power transmission paths in conjunction with rotation of the shift input member in the first direction such that the rotational velocity of the output component becomes lower than the rotational velocity of the input component.

18. The bicycle transmission according to claim 1, wherein
the axle is a hub axle, and
the output component is a hub shell.

* * * * *